United States Patent [19]
Hattori et al.

[11] Patent Number: 5,477,825
[45] Date of Patent: Dec. 26, 1995

[54] DRIVING POWER CONTROL APPARATUS FOR VEHICLE

[75] Inventors: Tatsuya Hattori, Susono; Masuji Oshima, Kariya; Hiroyuki Yoshida, Inazawa, all of Japan

[73] Assignee: Toyota Jidosha Kabushiki Kaisha, Toyota, Japan

[21] Appl. No.: 191,837

[22] Filed: Feb. 4, 1994

[30] Foreign Application Priority Data

Feb. 26, 1993 [JP] Japan .................................. 5-037784
Feb. 26, 1993 [JP] Japan .................................. 5-037785

[51] Int. Cl.$^6$ ...................................................... F02D 45/00
[52] U.S. Cl. ...................................................... 123/399
[58] Field of Search ...................................... 123/352, 399

[56] References Cited

U.S. PATENT DOCUMENTS

| | | | |
|---|---|---|---|
| 4,671,235 | 6/1987 | Hosaka | 123/399 X |
| 4,727,838 | 3/1988 | Oshiage et al. | 123/399 X |
| 4,984,545 | 1/1991 | Kaneyasu et al. | 123/399 |
| 5,133,021 | 7/1992 | Carpenter et al. | 382/15 |
| 5,200,898 | 4/1993 | Yuhara et al. | 123/361 X |

FOREIGN PATENT DOCUMENTS 1-294925  11/1989  Japan .
3-156601   7/1991  Japan .
3-235723  10/1991  Japan .
4-314940  11/1992  Japan .

Primary Examiner—Tony M. Argenbright
Attorney, Agent, or Firm—Kenyon & Kenyon

[57] ABSTRACT

Disclosed is a driving power control apparatus for a vehicle driven by an engine. A throttle valve which is openable and closable by a DC motor is provided in an air intake passage of the engine. The vehicle is provided with an acceleration sensor and a vehicle speed sensor. The vehicle is further provided with an accelerator pedal sensor for detecting the manipulation amount of the accelerator pedal that is manipulated by a driver. The vehicle is also provided with a neuro computer and a throttle computer for controlling the angle of the throttle valve based on the result of the detection by various sensors. With the acceleration detected by the acceleration sensor used as teaching data to be compared, the neuro computer learns the relationship among the manipulation amount detected by the accelerator pedal sensor, the speed detected by the vehicle speed sensor and the acceleration, as the output of a "requested-acceleration model". The neuro computer computes a throttle sensitivity from the difference between the output of the "requested-acceleration model" and the output of a standard "reference acceleration model" previously learned. Based on the throttle sensitivity output from the neuro computer, the throttle computer controls the DC motor in accordance with the manipulation of the accelerator pedal. Accordingly, the angle of the throttle valve is controlled and the output of the engine is controlled, thus controlling the driving power of the vehicle.

23 Claims, 14 Drawing Sheets

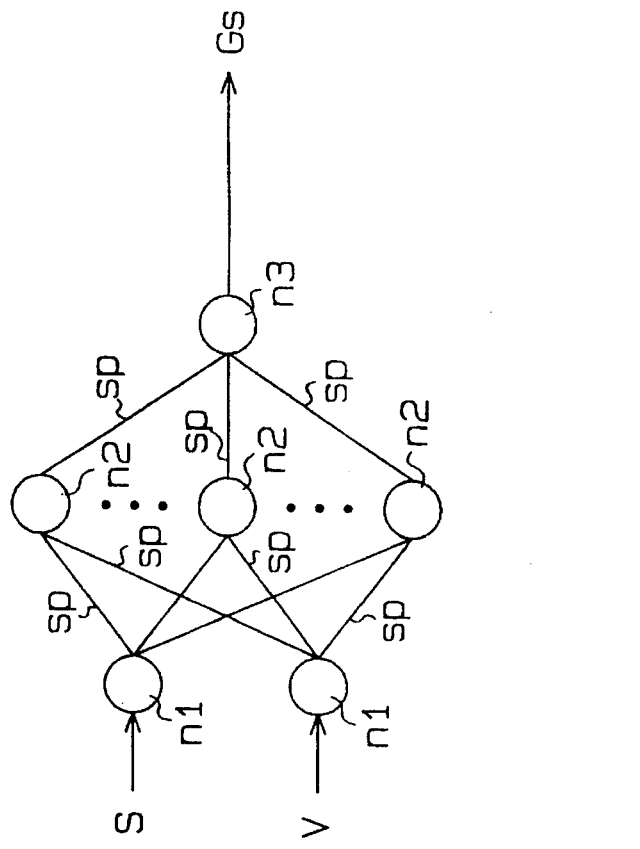
Fig. 3(b) [for reference acceleration model]
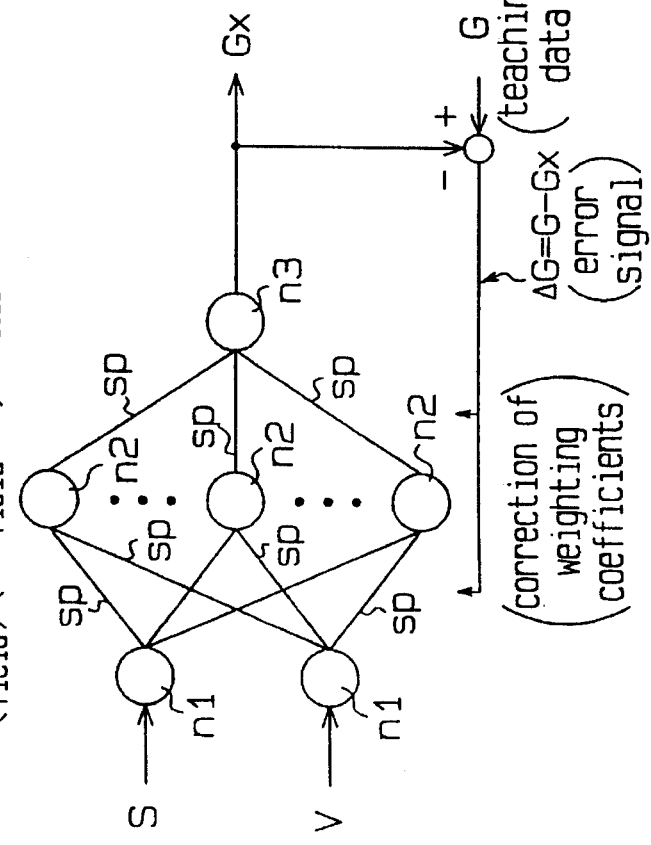
Fig. 3(a) [for learning requested-acceleration model]

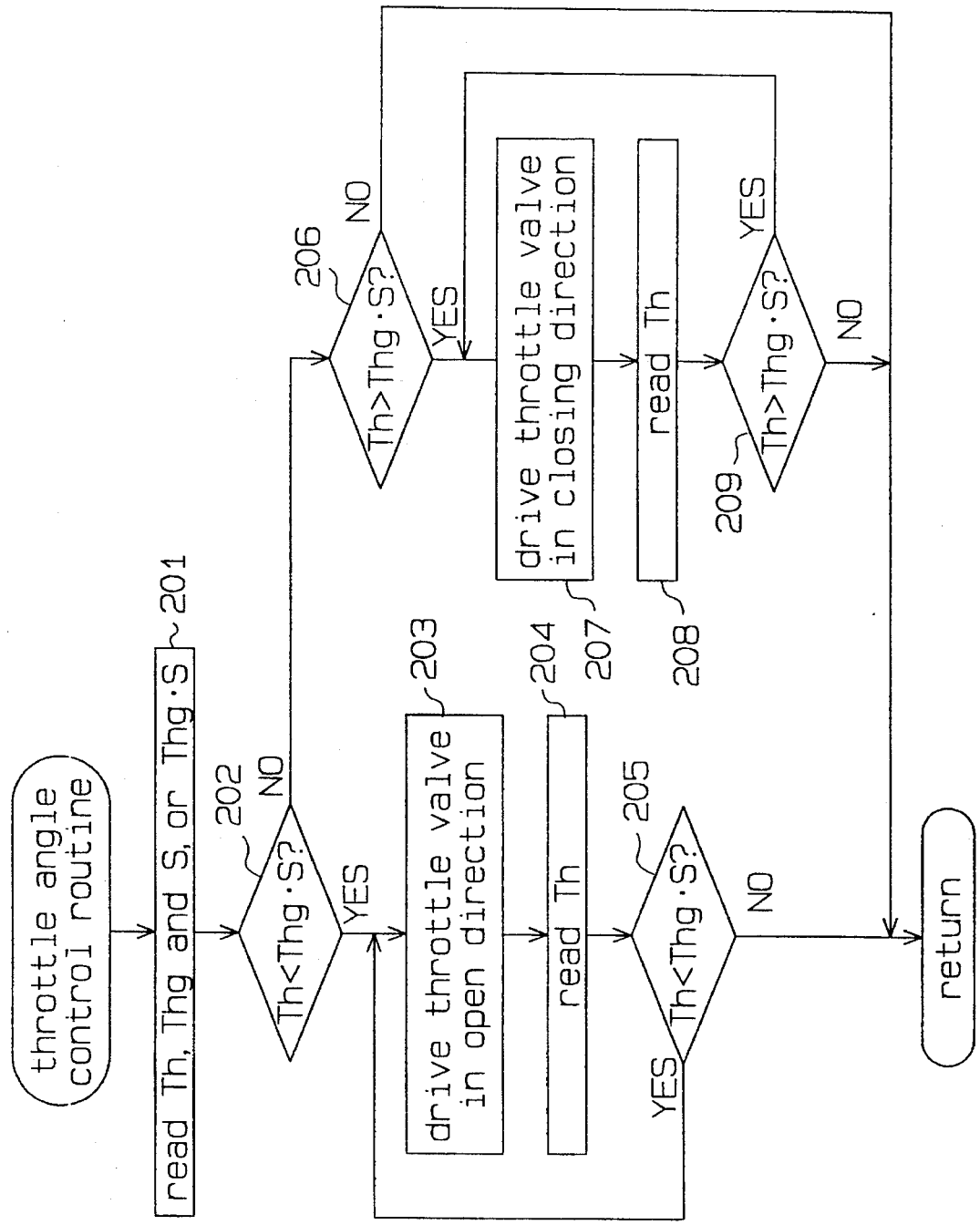

[for first reference acceleration model]

[for learning requested-acceleration model]

[for second reference acceleration model (nomal mode)]

[for second reference acceleration model (high mode)]

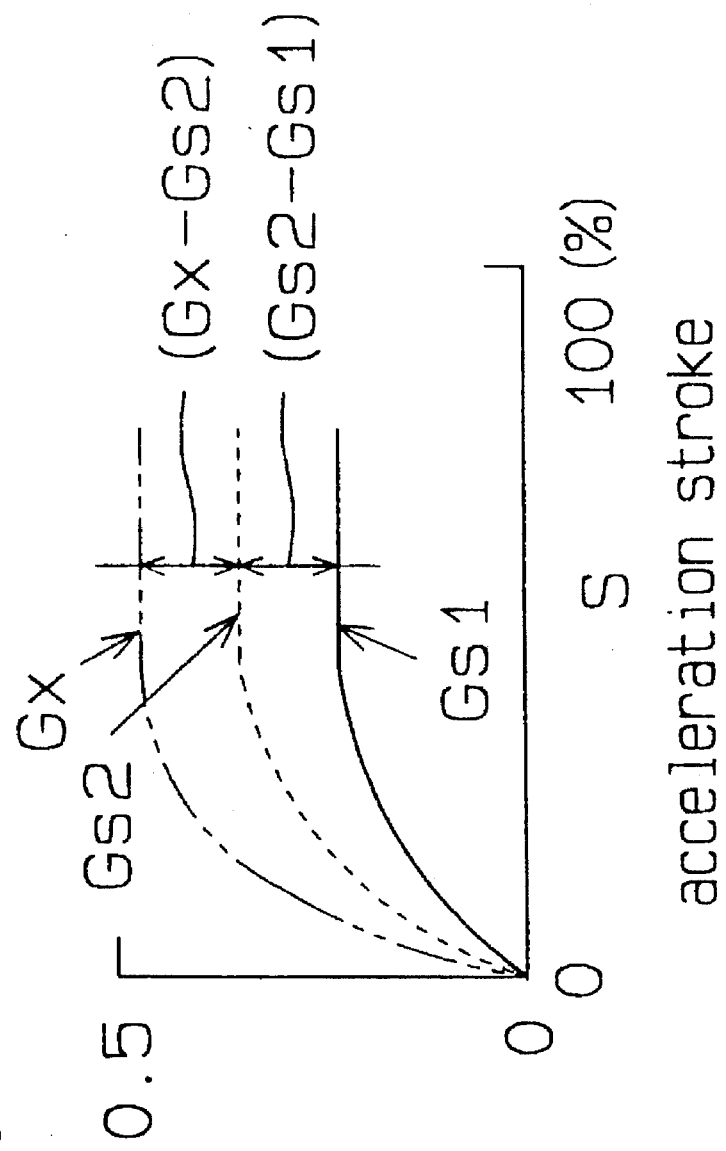

DRIVING POWER CONTROL APPARATUS FOR VEHICLE

BACKGROUND OF THE INVENTION

1. Field of the Invention

The present invention relates generally to a vehicle which is powered by the power from a driving source. More particularly, this invention relates to a driving power control apparatus for a vehicle, which controls driving power according to the acceleration of that vehicle requested by the driver.

2. Description of the Related Art

In general, vehicles are demanded to run under various environmental conditions and are each manipulated in different ways by different drivers. And, with respect to the behavior of the vehicles, there are demanded responding properties and smooth actions intended by the individual drivers. With regard to the behavior of the driving power in each vehicle, it is known that the action of an engine-mounted vehicle, for example, is controlled in accordance with the amount of the accelerator pedal thrust by the driver.

For instance, in the conventional control apparatus disclosed in Japanese Unexamined Patent Publication No. Hei 1-294925, the following control technique is employed. To describe in detail, in this control apparatus the throttle valve disposed in the intake passage of an engine is opened or closed by the actuator. The value of the target acceleration intended by the driver is predicted from the value of the thrust amount of the accelerator pedal (acceleration stroke), manipulated by the driver, and the value of the vehicle speed then. Further, obtained is the difference between the value of the predicted target acceleration and the value of the actual acceleration of the vehicle detected. Based on the acquired acceleration deviation, the angle of the throttle valve is compensated so that the value of the actual acceleration matches with the value of the target acceleration.

In this control apparatus, however, the characteristic of the target acceleration to be predicted is merely set specifically from a map in advance in accordance with the relationship between the acceleration stroke and the vehicle speed. Therefore, the characteristic of the target acceleration from the map is not necessarily matched with what is intended by the driver, making it difficult to suitably control the driving power of the vehicle to match with that of the driver's intention. In addition, the characteristic from the map is always the same for the same driver, so that when the mental state of the driver or the driving environment varies, the value of the target acceleration that would satisfy the driver may not be obtained. This is likely to deteriorate the driving performance of the vehicle that the driver would feel.

There has been proposed an improved control apparatus which is designed to cope with the above-described shortcoming and ensure the efficient use of the memory in the control apparatus and the prevention of a delay in the computation of the value of the target acceleration.

This improved control apparatus has a linkless throttle valve actuated by the actuator is provided in the intake passage of the engine mounted in a vehicle. The angle of the throttle valve is controlled in accordance with the thrust amount of the accelerator pedal (acceleration stroke) manipulated by the driver. Data which determines the valve of the target acceleration corresponding to the acceleration stroke is previously stored as a map in a backup RAM. The angle of the throttle value is controlled in such a manner that the actual acceleration of the vehicle matches with the target acceleration determined by this map. Through this control, the driving power of the vehicle is controlled. According to this control apparatus, a change in acceleration stroke and the actual acceleration are detected as the degree of the acceleration requested by the driver. The data on the map is corrected so as to minimize the difference between the detected degree of the requested acceleration and the value of the target acceleration which is to be determined from the map, and the corrected data is stored in the backup RAM again. That is, mathematically, the compensation (correction) on the value of the target acceleration is performed in accordance with the level of the mentioned difference and the map is rewritten accordingly. In other words, the data of the target acceleration corresponding to the acceleration stroke is properly updated and learned.

Since learning is executed in such a way that the data of the target acceleration matches with the acceleration requested by the driver, therefore, the target acceleration which meets the driver's request is always determined. As a result, it is possible to always obtain the driving power which matches with the characteristic of the driver, regardless of the mental state of the driver and the driving environment.

According to the above-described latter control technique, however, the data of the target acceleration is learned simply by compensating (correcting) the data and rewriting the map accordingly. The data of the target acceleration is merely learned just for a certain point or a certain range of the acceleration stroke. For the driving area involving the constant speed cruising, for example, the data of the target acceleration is merely learned just for the associated range of the acceleration stroke. For the driving area involving the rapid acceleration of the vehicle, likewise, the data of the target acceleration is merely learned just for the associated range of the acceleration stroke.

As the data of the target acceleration is thus compensated or corrected only for a specific partial driving area on the map, a regional unbalance may occur in the characteristic of the rewritten map. That is, even if the compensation or correction is performed on the target acceleration for a specific range of the acceleration stroke, that compensation (correction) will not be reflected on the other range of the acceleration stroke. This causes partial discontinuity on the relationship between the acceleration stroke and the target acceleration in the characteristic of the rewritten map, so that the characteristic of the control on the vehicle's driving power may partially become discontinuous with respect to a change in acceleration stroke.

In addition, in the latter conventional control apparatus, it takes a certain time to learn the acceleration requested by the driver, raising the following shortcoming. In the case where a plurality of drivers drive a specific vehicle, when the driver of the vehicle changes from one driver to another, the directivity or preference of the new driver is apt to differ from that of the previous one. In this case, it is not possible to update the learning status of the previous driver and to immediately reflect the preference of the new driver on the driving of the vehicle. For instance, when a driver who prefers to always driving the vehicle fast is changed to the one who prefers to always driving the vehicle slowly, there is some delay until the preference of the latter driver is reflected on the driving of the vehicle.

SUMMARY OF THE INVENTION

Accordingly, it is a primary objective of the present invention to provide a driving power control apparatus for a vehicle, which will accomplish control on the driving power that always matches with the characteristic of the driver, regardless of the mental state of the driver and the driving environment or conditions, and which will perform this driving power control continuously over the entire range of the amount of manipulation of the accelerator pedal or the like performed by the driver.

It is another objective of the present invention to provide a driving power control apparatus for a vehicle, which will accomplish control on the driving power that always matches with the characteristic of the driver, regardless of the mental state of the driver and the driving environment or conditions, and driving power control that promptly reflects the directivity or preference of each driver, and which will perform those driving power controls continuously over the entire range of the amount of manipulation of the accelerator pedal or the like performed by the driver.

To achieve the foregoing and other objects and in accordance with the purpose of the present invention, there is provided a driving power control apparatus for a vehicle, having a driving source mounted in a vehicle, driving wheels drivably coupled to said driving source in said vehicle, control-amount changing means for changing a control amount of said driving source, manipulation means operable by a driver to arbitrarily control an output of said driving source, and manipulation-amount detecting means for detecting a manipulation amount of said manipulation means, for activating said control-amount changing means in accordance with a value detected by said manipulation-amount detecting means to control said output of said driving source, thereby controlling driving power of said vehicle caused by said driving wheels, said apparatus comprising means for detecting an acceleration of said vehicle; means for detecting a speed of said vehicle; memory means for storing a reference acceleration model reflecting a previously learned relationship among said manipulation amount of said manipulation means, said speed of said vehicle and said acceleration of said vehicle; learning means for computing, as an error signal, a difference between an acceleration detected by said acceleration detecting means as teaching data to be compared, and an output of said acceleration detecting means, and learning a relationship among a manipulation amount detected by said manipulation-amount detecting means, a speed detected by said speed detecting means and said acceleration of said vehicle, as a acceleration model requested by said driver; computing means for computing a difference between an output of said acceleration model to be learned by said learning means and said reference acceleration model stored in said memory means, and computing a relationship among said manipulation amount detected by said manipulation-amount detecting means, said speed detected by said speed detecting means and said control amount of said driving source, as a control amount sensitivity, based on said difference; and control means for controlling activation of said control-amount changing means in accordance with said manipulation amount detected by said manipulation-amount detecting means, based on said control amount sensitivity computed by said computing means.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIGS. 3a and 3b are a structural diagram showing the conceptual structure of a multi-field neural network adapted to the neuro computer in the system in FIG. 1;

FIG. 8 is a flowchart illustrating a "throttle angle control routine" that is executed by the throttle computer in the system in FIG. 1;

FIG. 21 is a characteristic diagram for explaining the relationship among the "requested-acceleration model", "first reference acceleration model" and "second reference acceleration model" that the neuro computer executes.

DETAILED DESCRIPTION OF THE PREFERRED EMBODIMENTS

First and second embodiments of the present invention will be described below. The basic mechanical and electrical structures of systems of driving power control apparatuses for vehicles, which embody this invention, will be discussed in the section of the first embodiment. The section of the second embodiment will discuss only the differences between the second embodiment and the first embodiment.

First Embodiment

The first embodiment of this invention will now be described in detail with reference to FIGS. 1 through 9.

Figure 1:
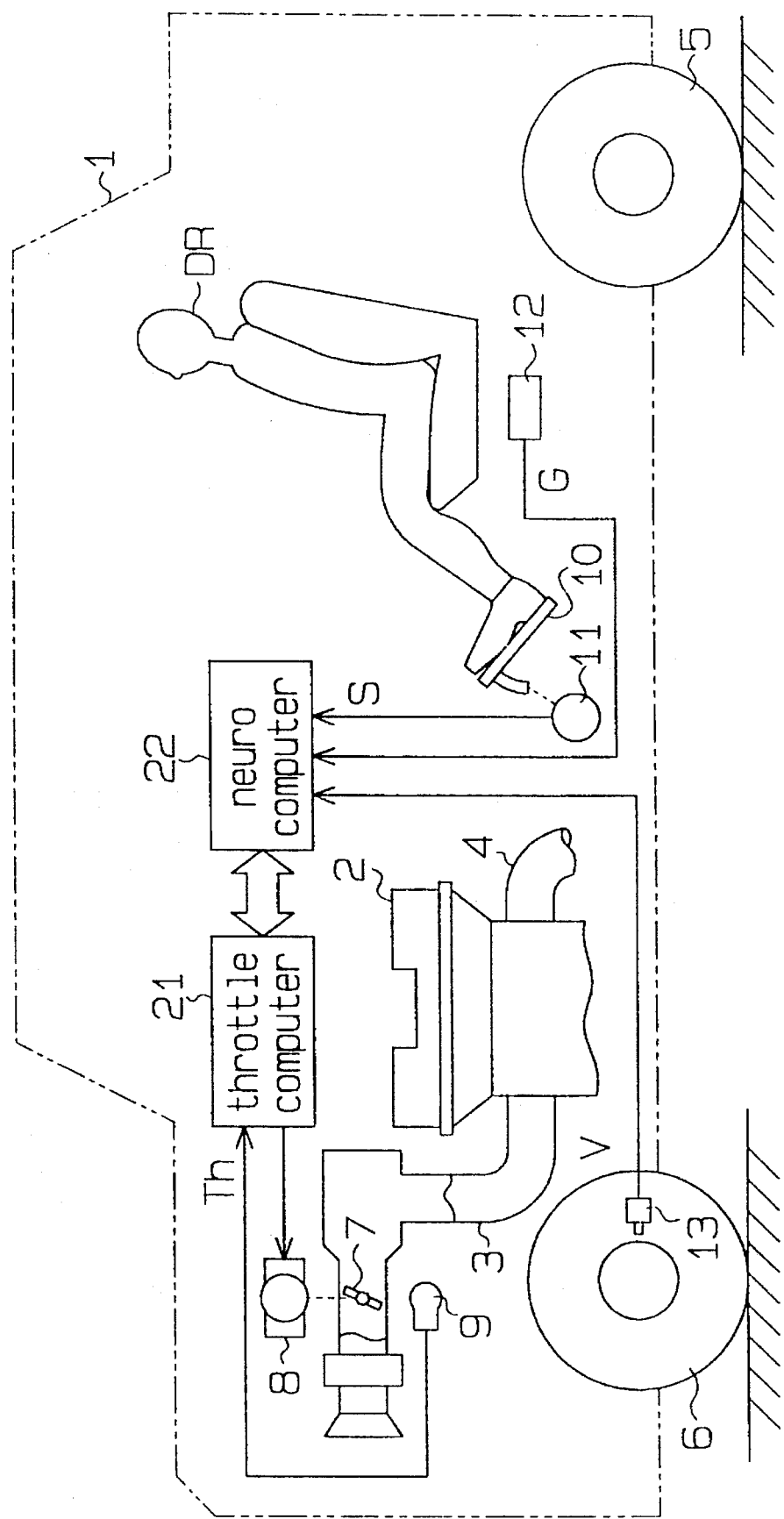
FIG. 1 is a schematic diagram showing the structure of a system of a driving power control apparatus for a vehicle according to a first embodiment of the present invention.

FIG. 1 presents a schematic diagram showing the structure of a system of a driving power control apparatus for a vehicle according to this embodiment. A gasoline engine 2 as a driving source is mounted in a vehicle 1. This engine 2 is a multi-cylinder in-line engine. The engine 2 is provided with an air intake passage 3 and an exhaust passage 4. The outside air is introduced into the air intake passage 3 and a fuel, injected from an injector (not shown), is also supplied there. A fuel mixture consisting of the air and fuel is fed in a plurality of combustion chambers (not shown) in the engine 2. As this fuel mixture is ignited and burnt by an ignition plug (not shown) in each combustion chamber, the piston, crankshaft, etc. (not shown) are moved to provide the output of the engine 2. The gas burnt in each combustion chamber in the engine 2 moves out through the exhaust passage 4.

In this embodiment, the vehicle 1 is a font-engined, rear-wheel drive (FR) type. The vehicle 1 has a pair of right and left rear wheels 5 as driving wheels 5 and a pair of right and left front wheels 6 as driven wheels. The crankshaft of the engine 2 is drivably coupled to both rear wheels 5 through a transmission, a propeller shaft, a differential gear, a drive shaft, etc. (none shown). Both front wheels 6 are interlocked with the manipulation of a steering wheel (not shown), provided at the driver's seat, to steer the vehicle 1.

A linkless type throttle valve 7 is provided in the air intake passage 3 in this embodiment. The throttle valve 7 is coupled to a DC motor 8 provided in its vicinity. As the DC motor 8 is driven, the angle Th of the throttle valve 7 (throttle angle) corresponding to the control amount of the engine 2 is adjusted. This angle control adjusts the amount of air that is taken into each combustion chamber of the engine 2 via the air intake passage 3, controlling the output of the engine 2.

Provided in the proximity of the throttle valve 7 is a throttle sensor 9, which detects the throttle angle Th and outputs a corresponding signal. An accelerator pedal 10 is provided at the driver's seat in the vehicle 1. This accelerator pedal 10 is manipulated by a driver DR to control the output of the engine 2 as needed. Provided in the vicinity of the accelerator pedal 10 is an accelerator pedal sensor 11, which detects the amount of the manipulation of the accelerator pedal or acceleration stroke S and outputs a corresponding signal. An acceleration sensor 12 of a known type is provided at near the center of the vehicle 1. The acceleration sensor 12 detects the forward or backward acceleration G of the vehicle 1 and outputs a corresponding signal. The front wheel 6 is provided with a vehicle speed sensor 13 of a known type, which detects the speed of the vehicle 1 or vehicle speed V in accordance with the number of rotations of the front wheels 6 and outputs a corresponding signal.

In this embodiment, a throttle computer 21 and a neuro computer 22 are installed in the vehicle 1 to properly control the angle of the throttle valve 7 in response to the request made by the driver DR. The throttle computer 21 is electrically connected to the DC motor 8 and the throttle sensor 9. The neuro computer 22 is constituted using the neural network technology. The accelerator pedal sensor 11, the acceleration sensor 12 and the vehicle speed sensor 13 are electrically connected to the neuro computer 22. Both computers 21 and 22 are electrically connected together.

Figure 2:
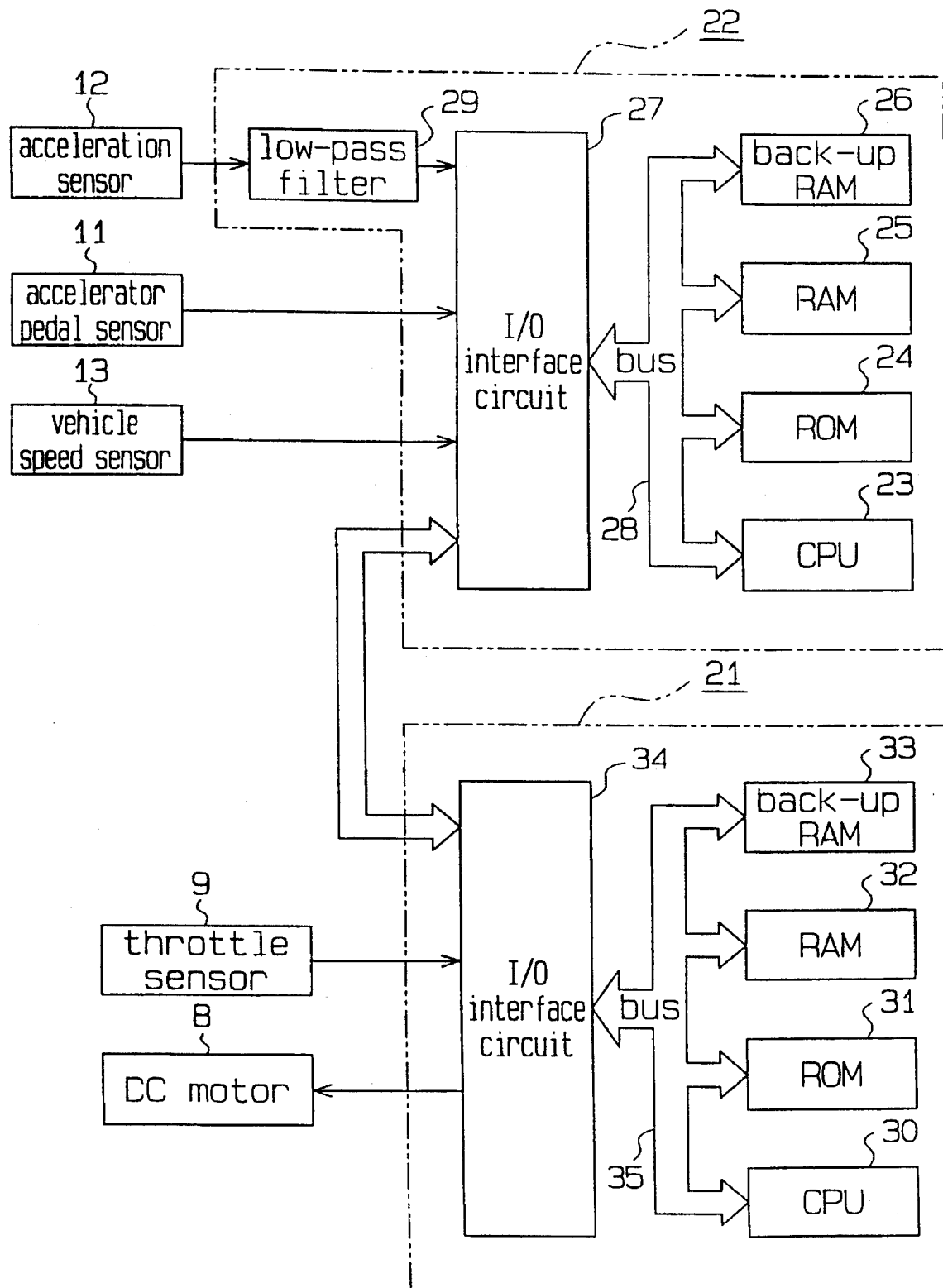
FIG. 2 is a block diagram showing the electrical structures of a throttle computer and a neuro computer, which control the system in FIG. 1.

FIG. 2 presents a block diagram showing the electrical structures of the throttle computer 21, neuro computer 22, and other components. The neuro computer 22 includes a central processing unit (CPU) 23, a read only memory (ROM) 24 in which a predetermined learning control program, etc. are stored in advance, a random access memory (RAM) 25 for temporary storage of the results of operations performed by the CPU 23, and a backup RAM 26 for saving previously stored data. Those individual components 23 to 26 of the neuro computer 22 are connected to an input/output (I/O) interface circuit 27 by a bus 28, constituting a logic operation circuit. The aforementioned accelerator pedal sensor 11 and vehicle speed sensor 13 are connected to the I/O interface circuit 27. The acceleration sensor 12 is connected via a low-pass filter 29 to the I/O interface circuit 27. This low-pass filter 29 passes that component of the detection signal of the acceleration sensor 12 whose frequency is lower than a reference cutoff frequency, and greatly attenuates that signal component whose frequency is higher than the reference frequency. The throttle computer 21 is connected to the I/O interface circuit 27. The ROM 24 holds in advance the aforementioned learning control program, which is based on the neural network technology, and other data.

The CPU 23 receives, as input values, various signals from the individual sensors 11 to 13 via the I/O interface circuit 27. Based on the input values, the CPU 23 executes learning control for a "requested-acceleration model" requested by the driver DR, in accordance with the learning control program stored in the ROM 24. The CPU 23 computes the throttle angle from the difference between the result of the learning and a "reference acceleration model", which has been learned in advance. The CPU 23 sends out the learning results and other associated data to the throttle computer 21 via the I/O interface circuit 27.

The structure of the throttle computer 21 is basically the same as that of the neuro computer 22, and comprises a CPU 30, a ROM 31, a RAM 32, a backup RAM 33, an I/O interface circuit 34, and a bus 35. The aforementioned DC motor 8, the throttle sensor 9 and the neuro computer 22 are connected to the I/O interface circuit 34. A throttle angle control program for controlling the angle of the throttle valve 7 based on the learning result of the neuro computer 22 is stored in advance in the ROM 31.

The CPU 30 receives, as input values, data of the learning results, etc. coming from the neuro computer 22 via the I/O interface circuit 34. The CPU 30 receives, as an input value, a signal sent from the throttle sensor 9. Based on those input values, the CPU 30 properly controls the DC motor 8 in accordance with the throttle angle control program stored in the ROM 31.

The conceptual structure of the neural network technology adapted to the neuro computer 22 will be discussed below with reference to FIGS. 3A and 3B.

The network technology in this embodiment includes two multi-field neural networks as shown in FIGS. 3A and 3B. Those neural networks basically have the same structure; each network includes an "input field" having two neurons n1, an "intermediate field" having two to ten neurons n2, and an "output field" having a single neuron n3. The individual neurons n1, n2 and n3 in the individual fields are coupled together by synapses sp. In each neural network, signals flow in one direction from the "input field", to the "intermediate field" and to the "output field". At each of the neurons n1, n2 and n3 of the individual fields, the state is determined on the basis of the signal received from the preceding field, and the signal is sent to the next field. The output result of each network is obtained as the state value of the neuron 3 of the "output field".

The neural network shown in FIG. 3A is for occasionally executing learning and updating. In this network, the value of the acceleration stroke S detected by the accelerator pedal sensor 11 is input to one of the neurons n1 of the "input field", while the value of the vehicle speed V detected by the vehicle speed sensor 13 is input to the other neuron n1. An output obtained from the neuron n3 of the "output field", i.e., a requested-acceleration model output Gx, is compared with the actual acceleration G of the vehicle 1 as "teaching data" detected by the acceleration sensor 12. The "weighting coefficients" of the synapses sp of all the neurons n1, n2 and n3 are so corrected as to decrease the error portion of an acceleration deviation ΔG (=G−Gx) obtained as an "error signal" through the comparison. That is, the actual acceleration G of the vehicle 1 is treated as the acceleration requested by the driver DR and is used as "teaching data" to be compared. The relationship among the acceleration stroke S, the vehicle speed V and the acceleration G is learned as the "requested-acceleration model" requested by the driver DR to make the deviation to the "teaching data" smaller. The output from this neural network is the requested-acceleration model output Gx. That is, the "requested-acceleration model" is learned, as the characteristic shown in FIG. 4, in such a direction that the requested-acceleration model output Gx approaches the actual acceleration G.

Figure 5:
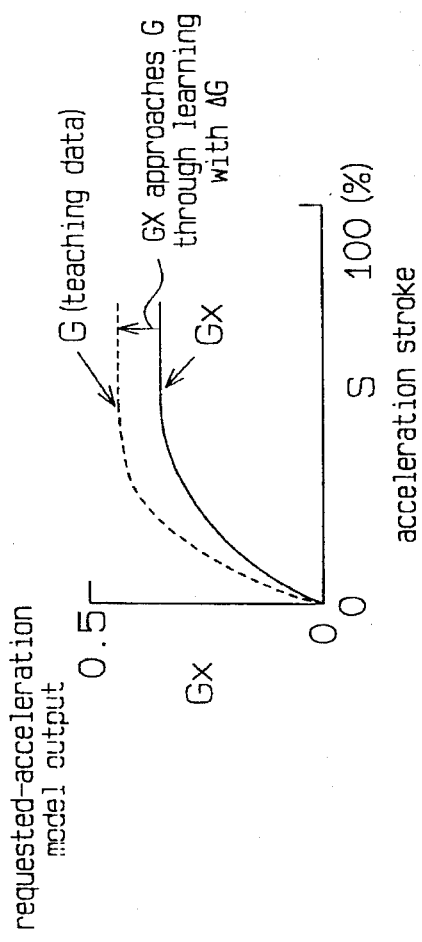
FIG. 5 is a characteristic diagram showing the characteristic of a "reference acceleration model" that is also learned by the neuro computer.

The neural network shown in FIG. 3B provides uncorrectable data, which is obtained by previously learning the standard (or "average") relationship among the acceleration stroke S, vehicle speed V and acceleration G, as the "reference acceleration model", from driving data provided by a plurality of drivers DR. In this neural network, the value of the acceleration stroke S is input to one of the neurons n1 of the "input field" and the value of the vehicle speed V is input to the other neuron n1. The value of a reference acceleration model output Gs corresponding to the values of the acceleration stroke S and vehicle speed V is obtained as the output result from the neuron n3 of the "output field". That is, the "reference acceleration model" is learned as a characteristic as shown in FIG. 5.

Figure 6:
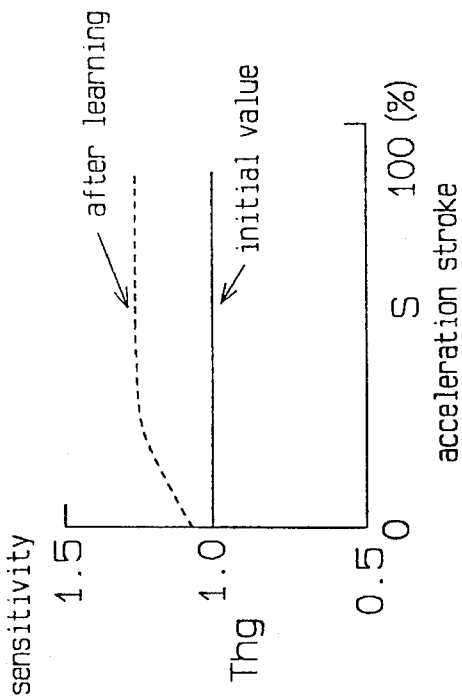
FIG. 6 is a characteristic diagram showing the characteristic of a "throttle sensitivity" that is also learned by the neuro computer.

The above-described conceptual structure of the neural network is merely given for the sake of convenience. The core of the neural network lies in the learning control program which is stored in advance in the ROM 24 of the neuro computer 22. The neural network is realized by mathematical operations in the learning control program. A typical "error feedback learning algorithm" is applied as the learning method. In this embodiment, the learning control program is prepared to finally obtain the relationship between the acceleration stroke S and the throttle sensitivity Thg as shown in FIG. 6.

Figure 7:
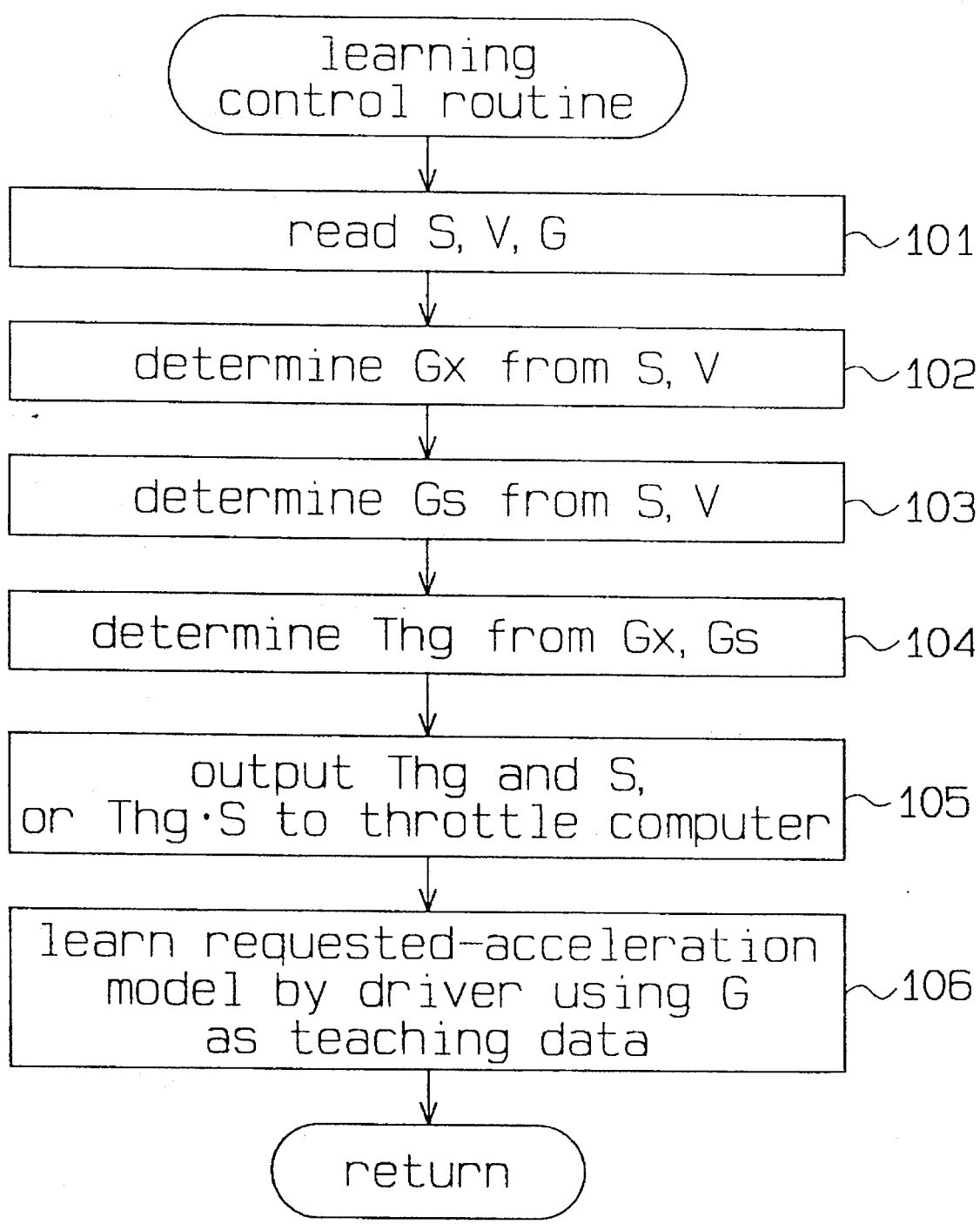
FIG. 7 is a flowchart illustrating a "learning control routine" that is also executed by the neuro computer.

A description will now be given of operations for learning the "requested-acceleration model", "throttle sensitivity model" and other models which are executed by the neuro computer 22 using the above-described neural network technology. FIG. 7 shows a flowchart illustrating the "learning control routine" in the learning control program, which is run by the neuro computer 22. This routine is cyclically executed at a given period, for example, "0.1 sec", once the routine starts.

When this routine starts, the neuro computer 22 reads the acceleration stroke S, acceleration G and vehicle speed V based on various signals from the accelerator pedal sensor 11, acceleration sensor 12 and vehicle speed sensor 13 (step 101).

In the next step 102, the neuro computer 22 determines the value of the requested-acceleration model output Gx based on the values of the acceleration stroke S and vehicle speed V read this time. In other words, the neuro computer 22 computes the value of the requested-acceleration model output Gx from the characteristic of the already learned "requested-acceleration model" (see FIG. 4) based on the values of the acceleration stroke S and vehicle speed V as input values.

In the next step 103, the neuro computer 22 determines the value of the reference acceleration model output Gs based on the values of the acceleration stroke S and vehicle speed V read this time. In other words, the neuro computer 22 computes the value of the reference acceleration model output Gs from the characteristic of the already learned "reference acceleration model" (see FIG. 5) based on the values of the acceleration stroke S and vehicle speed V as input values.

In step 104, the neuro computer 22 determines the throttle sensitivity Thg based on the values of the currently obtained requested-acceleration model output Gx and reference acceleration model output Gs. More specifically, the neuro computer 22 determines the throttle sensitivity Thg from the following equation (1).

$$Thg = \alpha + (Gx - Gs) * K \qquad (1)$$

where α is a reference value that is set to "1.0" in this embodiment and K is a positive constant.

Suppose that the characteristic of the current "requested-acceleration model" is the curve indicated by the broken line in FIG. 5 while the characteristic of the "reference acceleration model" is the curve indicated by the solid line. In this case, the difference (Gx−Gs) between the value of the requested-acceleration model output Gx with respect to a given acceleration stroke S and the value of the reference acceleration model output Gs is reflected on the value of the throttle sensitivity Thg. The greater the difference between the values of the requested-acceleration model output Gx and the reference acceleration model output Gs is on the positive side, the larger the value of the throttle sensitivity Thg becomes. In other words, as the acceleration G requested by the driver DR then becomes greater than the reference acceleration, the value of the throttle sensitivity Thg becomes larger.

The neuro computer 22 sends the value of the currently-determined throttle sensitivity Thg and the value of the acceleration stroke S to the throttle computer 21 in step 105. Alternatively, the computer 22 multiplies the value of the throttle sensitivity Thg by the value of the acceleration stroke S to obtain a target throttle angle Thg°S and sends the target throttle angle Thg°S to the throttle computer 21.

Then, the neuro computer 22 learns the "requested-acceleration model" requested by the driver DR using the value of the acceleration G of the vehicle 1 as "teaching data" in step 106. More specifically, the neuro computer 22 treats the value of the actual acceleration G of the vehicle 1 detected by the acceleration sensor 12, as "teaching data" to be compared, and learns the relationship among the values of the acceleration stroke S, the vehicle speed V and the acceleration G as the "requested-acceleration model" requested by the driver DR, in such a way as to reduce the deviation to the "teaching data".

Figure 4:
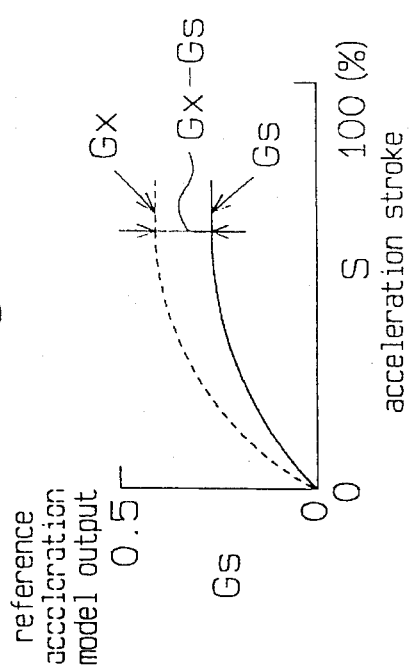
FIG. 4 is a characteristic diagram showing the characteristic of a "requested-acceleration model" that is learned by the neuro computer in the system in FIG. 1.

Suppose that the curve indicated by the solid line in FIG. 4 is the characteristic of the current "requested-acceleration model". Also suppose that the driver DR manipulates the accelerator pedal 10 to run the vehicle 1 faster and the value of the actual acceleration G becomes greater than the value of the current requested-acceleration model output Gx. The value of the acceleration G this time is a new requested acceleration, and the current characteristic of the "requested-acceleration model" indicated by the solid line in FIG. 4 is altered to the one indicated by the broken line. That is, the whole relationship among the acceleration stroke S, the vehicle speed V and the requested-acceleration model output Gx is learned as a continuous model. This characteristic will not be partially discontinuous.

Although FIG. 4 shows the characteristics when the value of the vehicle speed V is "0", the relationship among the entire range of the acceleration stroke S, the entire range of the vehicle speed V and the acceleration G of the vehicle 1 is learned in the "requested-acceleration model".

After executing the process of step 106, the neuro computer 22 temporarily terminates the subsequent process. When "0.1 sec" passes after the routine has started, the neuro computer 22 starts the routine from step 101 again.

Learning control using the neural network technology is carried out in this manner, and the characteristic of the "requested-acceleration model" requested by the driver DR is learned. In the learning, the "weighting coefficients" of the synapses sp as the characteristic of the "requested-acceleration model", which is occasionally learned, will be rewritten and stored in the backup RAM 26.

It should be noted that the initial values of the "weighting coefficients" at the time of factory shipment of the vehicle 1 are those of the "reference acceleration model".

A description will now be given of the operations for the throttle angle control that is executed by the throttle computer 21, based on the value of the throttle sensitivity Thg determined in the above-described routine and the acceleration stroke S given then. FIG. 8 shows a flowchart illustrating the "throttle angle control routine" in the throttle angle control program, which is run by the throttle computer 21. This routine is cyclically executed at a given interval once started.

When this routine starts, first, the throttle computer 21 reads the value of the throttle angle Th based on the signal from the throttle sensor 9 in step 201. The throttle computer 21 reads the value of the latest throttle sensitivity Thg and the acceleration stroke S, output or the value of the target throttle angle Thg°S output from the neuro computer 22. If reading of the values of the throttle sensitivity Thg and acceleration stroke S is the premise, the throttle computer 21 obtains the product of Thg and S as the value of the target throttle angle Thg°S.

In the next step 202, the throttle computer 21 determines if the current throttle angle Th is smaller than the target throttle angle Thg°S. When the value of the throttle angle Th is smaller than the value of the target throttle angle Thg°S, the throttle computer 21 rotates the DC motor 8 forward to drive the throttle valve 7 in the opening direction in step 203. Subsequently, the throttle computer 21 reads the value of the throttle angle Th based on the signal from the throttle sensor 9 in step 204.

In the next step 205, the throttle computer 21 determines again if the throttle angle Th is smaller than the target throttle angle Thg°S. When the value of the throttle angle Th is smaller than the value of the target throttle angle Thg°S, the throttle computer 21 returns to step 203 and repeats the sequence of processes of steps 203 to 205 to further drive the throttle valve 7 in the opening direction. If the value of the throttle angle Th is equal to or larger than the value of the target throttle angle Thg°S, the throttle computer 21 determines that the throttle valve 7 should not be driven further in the opening direction, and temporarily terminates the subsequent process.

If the value of the current throttle angle Th is not smaller than the value of the target throttle angle Thg°S in step 202, the throttle computer 21 proceeds to step 206 to determine if the value of the throttle angle Th is larger than the value of the target throttle angle Thg°S. When the value of the throttle angle Th is not larger than the value of the target throttle angle Thg°S, the throttle computer 21 temporarily terminates the subsequent process.

If the value of the throttle angle Th is larger than the value of the target throttle angle Thg°S in step 206, the throttle computer 21 moves to step 207 and rotates the DC motor 8 backward to drive the throttle valve 7 in the closing direction. The throttle computer 21 reads the value of the throttle angle Th based on the signal from the throttle sensor 9 in the subsequent step 208.

In the next step 209, the throttle computer 21 determines if the value of the throttle angle Th is larger than the value of the target throttle angle Thg°S. When the value of the throttle angle Th is larger than the value of the target throttle angle Thg°S, the throttle computer 21 returns to step 207 and repeats the sequence of processes of steps 207 to 209 to further drive the throttle valve 7 in the closing direction. If the value of the throttle angle Th is equal to or smaller than the value of the target throttle angle Thg°S in step 209, on the other hand, the throttle computer 21 determines that the throttle valve 7 should not be driven further in the closing direction, and temporarily terminates the subsequent process.

In this manner, the rotation of the DC motor 8 is controlled in such a way that the value of the throttle angle Th matches with that of the target throttle angle Thg°S and the angle of the throttle valve 7 is controlled accordingly. As a result, the output of the engine 2 is controlled and the driving power of the vehicle 1 is controlled accordingly.

As described above, according to the first embodiment, a request on the running of the vehicle 1 made by the driver DR is estimated as the "requested-acceleration model" from the value of the actual acceleration G detected occasionally. The value of the throttle sensitivity Thg is determined on the basis of the difference (Gx−Gs) between the value of the requested-acceleration model output Gx obtained from the "requested-acceleration model" and the value of the reference acceleration model output Gs obtained from the "reference acceleration model". Further, the value of the target throttle angle Thg°S is obtained by multiplying the determined value of the throttle sensitivity Thg by the value of the acceleration stroke S. The angle of the throttle valve 7 is controlled in such a way that the value of the target throttle angle Thg°S coincides with the value of the actual throttle angle Th. What is more, in this embodiment, the "requested-acceleration model" according to the request made by the driver DR is always obtained, and the value of the throttle sensitivity Thg is obtained in association with the level of that "requested-acceleration model". In accordance with the value of that throttle sensitivity Thg, the angle of the throttle valve 7 or the throttle angle Th is always controlled with the acceleration G that meets the request by the driver DR.

When the acceleration of the vehicle 1 requested by the driver DR is large, therefore, the value of the throttle sensitivity Thg to be determined increases. This narrows the range of a change in acceleration stroke S to attain the same value of the acceleration G, thus providing a large acceleration G simply through slight manipulation of the accelerator pedal 10. Accordingly, the driver DR will feel as if the accelerating performance of the vehicle 1 has been improved. For example, when the driver DR is in a hurry or is driving the vehicle 1 on a clear expressway without a traffic jam and thus wants to drive the vehicle 1 faster, a large acceleration G can be yielded by slight manipulation of the accelerator pedal 10, thus improving the feeling of the driver DR on the acceleration of the vehicle 1.

When the acceleration of the vehicle 1 requested by the driver DR is small, on the other hand, the value of the throttle sensitivity Thg to be determined decreases. This widens the range of a change in acceleration stroke S to attain the same value of the acceleration G, thus providing a fine variation in acceleration G through large manipulation of the accelerator pedal 10. Accordingly, the operability of the accelerator pedal 10 by the driver DR will be improved. For example, when the driver DR is not in a hurry or is driving the vehicle 1 on a road under poor conditions, such as a traffic jam or snowy weather, and thus wants to drive the vehicle 1 slowly, the acceleration G can be changed finely through large manipulation of the accelerator pedal 10, thus improving the operability of the vehicle 1 for the driver DR.

In short, according to this embodiment, since learning is performed in such a way as to meet the request on the acceleration made by the driver DR, the throttle sensitivity Thg which matches with the characteristic of the driver DR is always determined. As a result, it is always possible to perform control on the driving power of the vehicle 1 which matches with the characteristic of the driver DR, regardless of the mental state of the driver DR (in a hurry, relaxed, etc.) and the driving environment (road conditions, day or night, inside a tunnel, rainy or snowy weather, mounting road, traffic jam, etc.).

According to this embodiment, the value of the acceleration G of the vehicle 1 changes in accordance with a change in the value of the throttle sensitivity Thg or a change in difference (Gx–Gs) between the value of the requested-acceleration model output Gx predicted through the learning and the value of the previously-set reference acceleration model output Gs. That is, the value of the acceleration G of the vehicle 1 with respect to a given value of the acceleration stroke S changes greatly by the comparison of the standard, reference driving of the vehicle 1 with the current driving thereof, not by the comparison between the old driving of the vehicle 1 and the current driving thereof. When a change in the mentioned difference (Gx–Gs) is small, therefore, a change in the value of the throttle sensitivity Thg also becomes small, reducing a change in the actual acceleration G of the vehicle 1. When a change in the mentioned difference (Gx–Gs) is large, on the other hand, a change in the value of the throttle sensitivity Thg also becomes large, increasing a change in the actual acceleration G of the vehicle 1. For the driver DR who tries to always drive the vehicle 1 fast or who tries to always drive the vehicle 1 slowly, as different from the characteristic of the "reference acceleration model", the value of the throttle sensitivity Thg will not vary greatly so that the value of the acceleration G of the vehicle 1 will not vary significantly. For the driver DR who tries to always drive the vehicle 1 at the normal condition, which is closed to the characteristic of the "reference acceleration model", the value of the throttle sensitivity Thg will not vary greatly so that the value of the acceleration G of the vehicle 1 will not vary significantly.

Further, according to this embodiment, since the neural network technology is employed in learning control by the neuro computer 22, the whole relationship among the values of the acceleration stroke S, the vehicle speed V and the requested-acceleration model output Gx is learned as a continuous model, and the characteristic will not be partially discontinuous. This is because the use of the neural network technology interpolates the "requested-acceleration model" which should be learned between discontinuous points of the acceleration stroke S and vehicle speed V. That is, the correction of the requested-acceleration model output Gx that is to be learned for a specific range of the acceleration stroke S and the vehicle speed V reflects on the correction of the requested-acceleration model output Gx for another range of the acceleration stroke S and vehicle speed V.

Accordingly, it is possible to continuously control the driving power of the vehicle 1 for the entire range of the vehicle speed V for the amount of the manipulation of the accelerator pedal 10 by the driver DR or over the entire manipulation range of the acceleration stroke S. When the accelerator pedal 10 is continuously thrust downward over a certain range by the driver DR, therefore, the acceleration G of the vehicle 1 will not change abruptly, thus always ensuring a smooth increase in vehicle speed V.

Further, according to this embodiment, the value of the throttle sensitivity Thg is determined from the difference between the value of the requested-acceleration model output Gx, which is estimated from the value of the actual acceleration G, and the value of the reference acceleration model output Gs. This eliminates the need for interpolation of a map and will shorten the calculation time accordingly as compared with the case where a map is redrawn by the conventional compensation (correction).

Figure 9A:
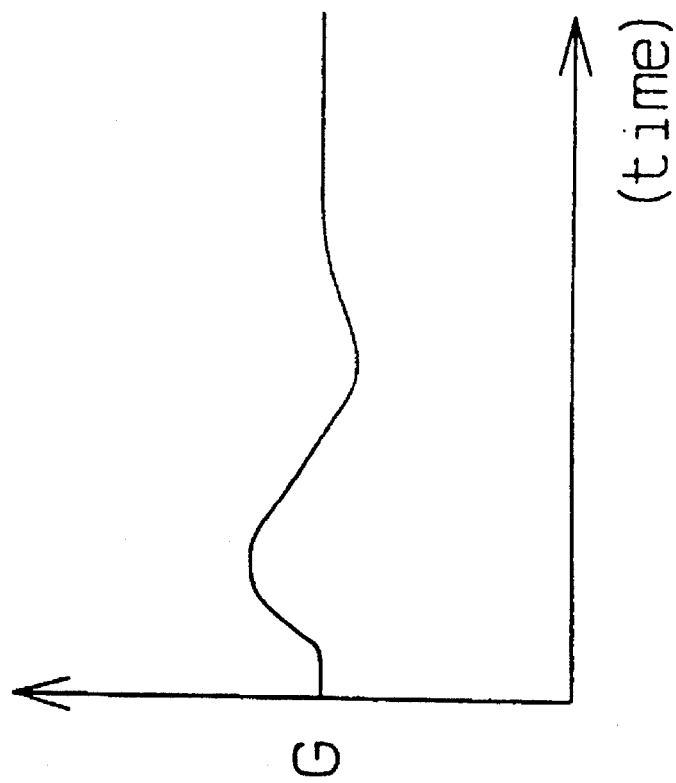
FIGS. 9a and 9b are a time chart showing the action of a low-pass filter provided in the neuro computer of the system in FIG. 1.
Figure 9B:
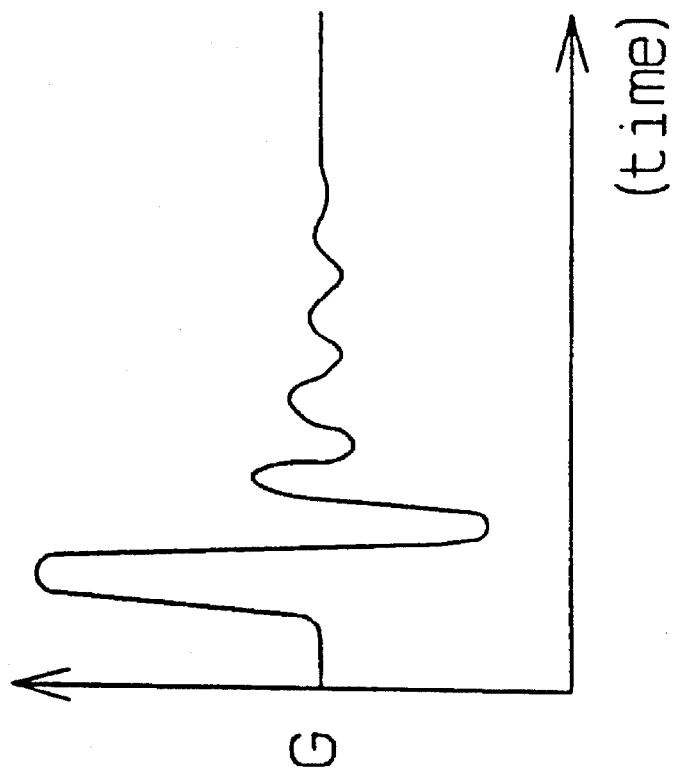

In addition, according to this embodiment, the acceleration sensor 12 is connected to the I/O interface circuit 27 of the neuro computer 22 via the low-pass filter 29. Even when noise enters on the detection signal of the acceleration sensor 12 due to harshness while the vehicle 1 is moving on a rough road, therefore, a high-frequency component relative to that noise will be attenuated by the low-pass filter 29. That is, even when the signal about the acceleration G from the acceleration sensor 12 contains harshness-oriented noise which causes a large change as shown in FIG. 9A, that signal after passing the low-pass filter 29 is adjusted to simply become the signal of the acceleration G with reduced noise as shown in FIG. 9B.

Consequently, the neuro computer 22 can eliminate harshness-oriented noise from the signal of the acceleration G that should be used in learning. It is therefore possible to prevent erroneous learning of the "requested-acceleration model" and eventually prevent the adjustment of the throttle sensitivity Thg in the wrong direction.

Second Embodiment

The second embodiment of this invention will now be described referring to FIGS. 10 through 21. The basic structure of a system according to the second embodiment is the same as that of the first embodiment. The following description of the second embodiment will therefore be centered on the differences between this embodiment and the first embodiment.

Figure 10:
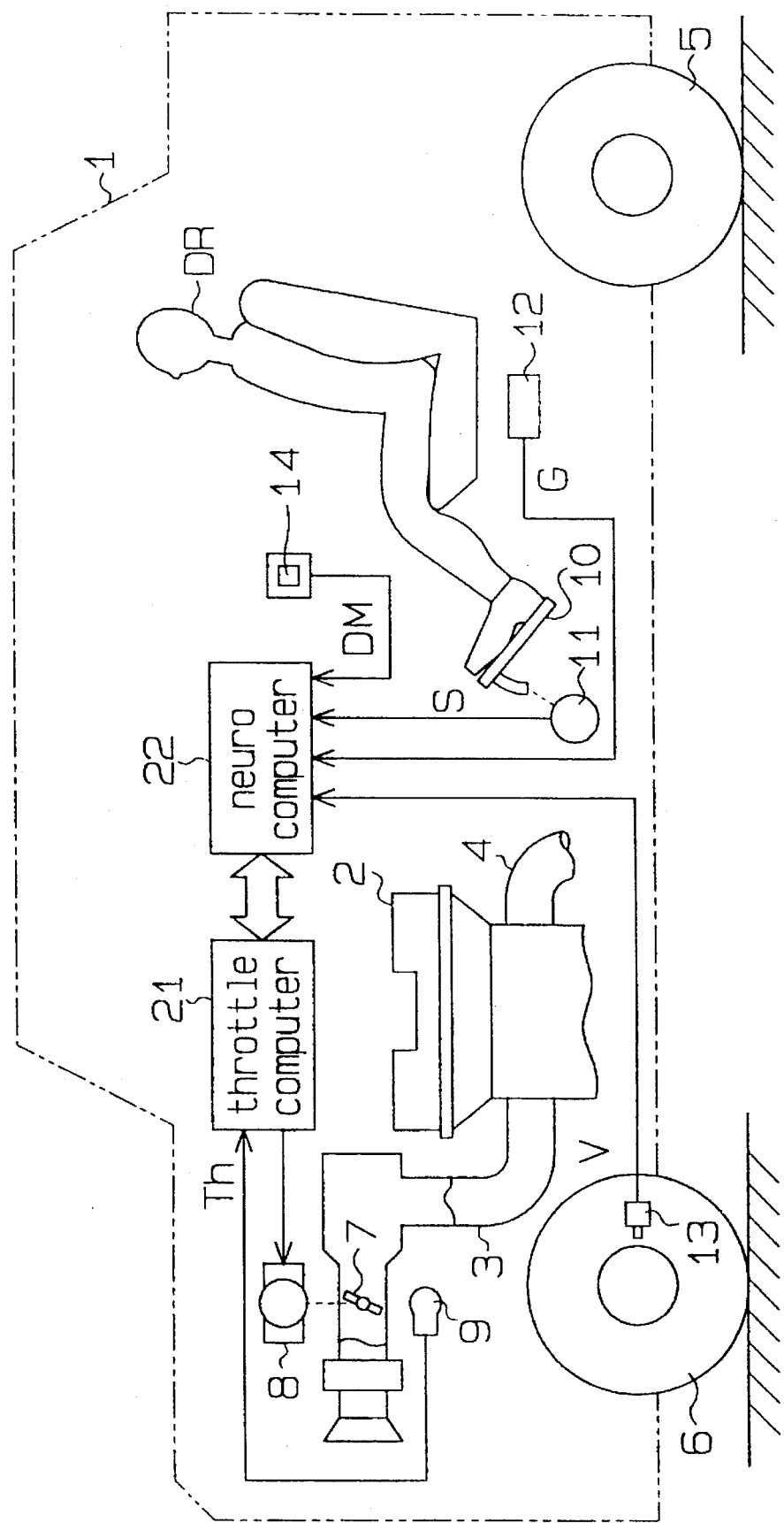
FIG. 10 is a schematic diagram showing the structure of a system of a driving power control apparatus for a vehicle according to a second embodiment of the present invention.

FIG. 10 presents a diagram showing schematically the structure of the system of a driving power control apparatus for a vehicle according to the second embodiment. In this embodiment, a mode select switch is provided at the driver's seat in addition to the structure of the system of the first embodiment. This switch 14 is operated to select a mode (directivity mode) DM preferred by the driver DR. In this embodiment, there are a total of three driving directivity modes DM available: "high mode (H)" for driving with high acceleration, "low mode (L)" for driving with low acceleration, and "normal mode (N)" for driving with standard acceleration. When the mode select switch 14 is manipulated to select one of the directivity modes DM, a signal representing the selected directivity mode DM is sent to the neuro computer 22 from the switch 14.

The basic structure of the neuro computer 22 in this embodiment is the same as that of the first embodiment, except that the CPU constituting the computer 22 reads the signal from the mode select switch 14 as an input value in addition to the signals from the individual sensors 11 to 13. The CPU executes learning control for the "requested-acceleration model" requested by the driver DR in accordance with the learning control program stored in the ROM. The CPU computes the difference between the learning result and the "second reference acceleration model" selected according to the directivity mode DM mentioned above. The CPU also computes the difference between the "second reference acceleration model" and the standard "first reference acceleration model". The CPU computes the throttle sensitivity Thg from those differences, and outputs the learning result, etc. to the throttle computer 21 through the I/O interface circuit 27. The "first reference acceleration model" and the "second reference acceleration model" are learned and stored in advance in the ROM. The basic structure and function of the throttle computer 21 are the same as those of the first embodiment.

The conceptual structure of a neural network adapted to the neuro computer 22 will be described below. This embodiment has five multi-field neural networks as shown in FIGS. 11 to 15. The individual neural networks fundamentally have the same structure, which is basically the same as that of the first embodiment.

Figure 11:
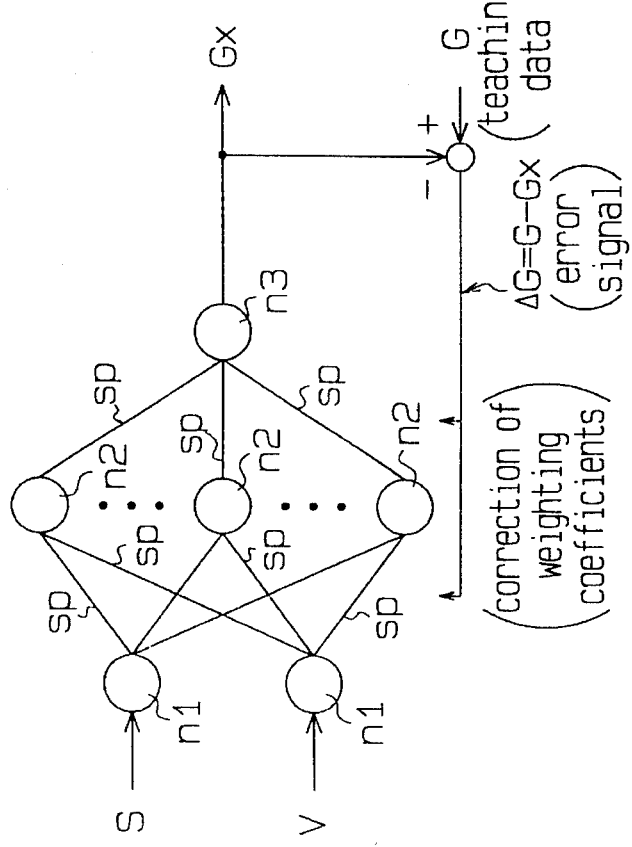
FIG. 11 is a structural diagram showing the conceptual structure of a multi-field neural network adapted to the neuro computer of the system in FIG. 10.

The neural network shown in FIG. 11 is for occasionally executing learning and updating. In this network, the value of the acceleration stroke s detected by the accelerator pedal sensor 11 is input to one of the neurons n1 of the "input field", while the value of the vehicle speed V detected by the vehicle speed sensor 13 is input to the other neuron n1. An output obtained from the neuron n3 of the "output field", i.e., a requested-acceleration model output Gx, is compared with the value of the acceleration G of the vehicle 1 as "teaching data" detected by the acceleration sensor 12. The "weighting coefficients" of the synapses sp of all the neurons n1, n2 and n3 are so corrected as to decrease the error portion of an acceleration deviation $\Delta G$ (=G−Gx) obtained as an "error signal" through the comparison. That is, the value of the actual acceleration G of the vehicle 1 is treated as the acceleration requested by the driver DR and is used as "teaching data" to be compared. The relationship among the values of the acceleration stroke S, the vehicle speed V and the acceleration G is learned as the "requested-acceleration model" requested by the driver DR to make the deviation to the "teaching data" smaller. The output from this neural network is the requested-acceleration model output Gx. That is, the "requested-acceleration model" is learned, as the characteristic shown in FIG. 16, in such a direction that the requested-acceleration model output Gx approaches the actual acceleration G.

Figure 12:
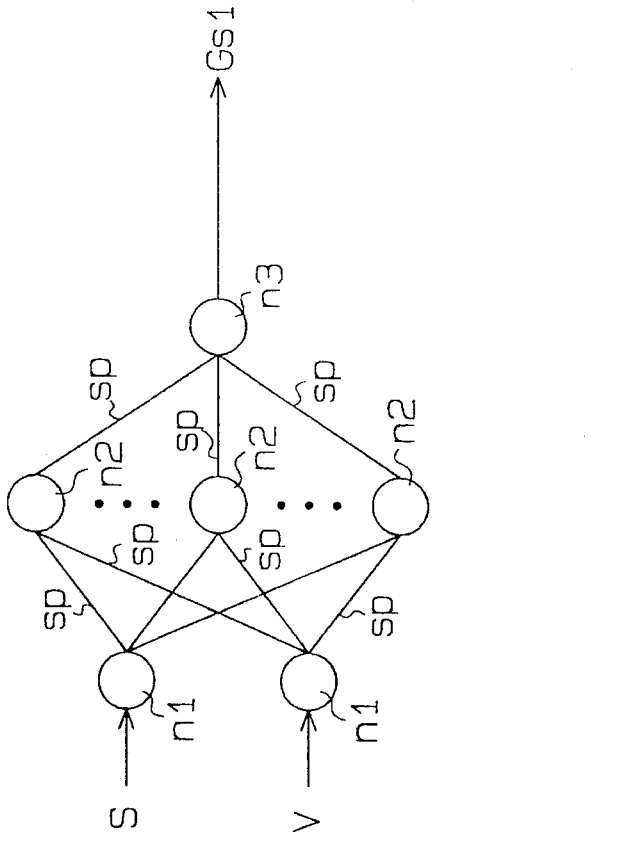
FIG. 12 is a structural diagram showing the conceptual structure of a multi-field neural network also adapted to the neuro computer.
Figure 17:
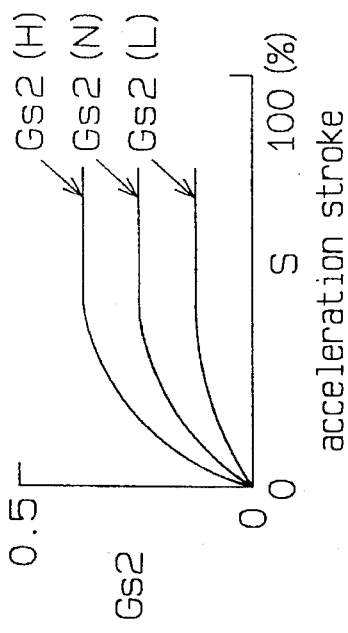
FIG. 17 is a characteristic diagram showing the characteristic of a "first reference acceleration model" that is also learned by the neuro computer.

The neural network shown in FIG. 12 provides uncorrectable data, which is obtained by previously learning the standard (or "average") relationship among the acceleration stroke S, vehicle speed V and acceleration G, as the "first reference acceleration model", from driving data provided by a plurality of drivers DR. In this neural network, the value of the acceleration stroke S is input to one of the neurons n1 of the "input field" and the value of the vehicle speed V is input to the other neuron n1. The value of the first reference acceleration model output Gs1 corresponding to the values of the acceleration stroke S and vehicle speed V is obtained as the output result from the neuron n3 of the "output field". That is, the "first reference acceleration model" is learned as a characteristic as shown in FIG. 17.

Figure 14:
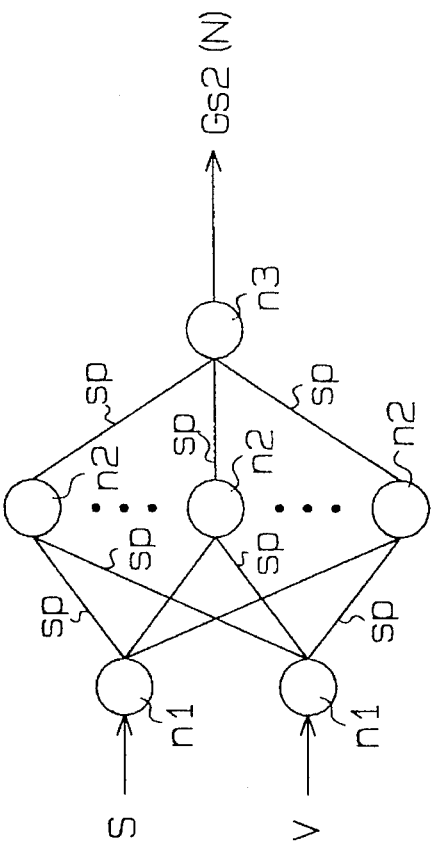
FIG. 14 is a structural diagram showing the conceptual structure of a multi-field neural network also adapted to the neuro computer.
Figure 13:
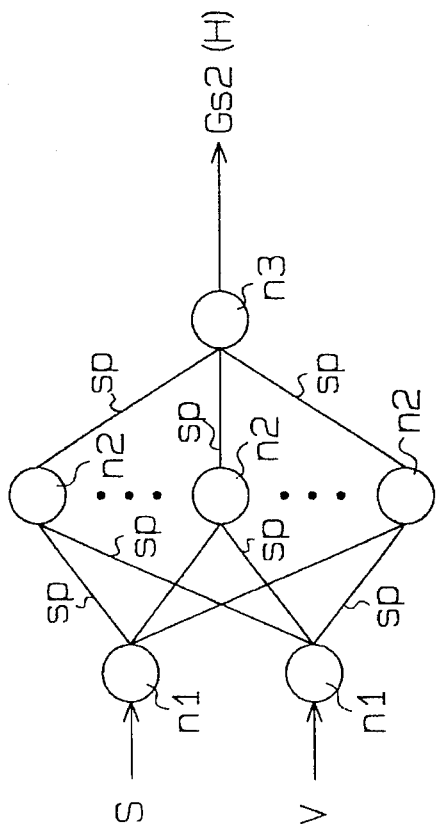
FIG. 13 is a structural diagram showing the conceptual structure of a multi-field neural network also adapted to the neuro computer.
Figure 15:
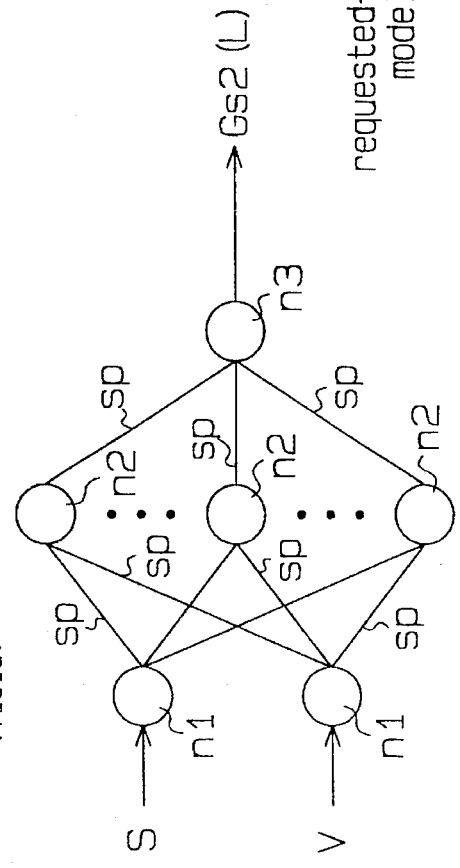
FIG. 15 is a structural diagram showing the conceptual structure of a multi-field neural network also adapted to the neuro computer.

The neural networks shown in FIGS. 13 to 15 provide uncorrectable data, which is obtained by previously learning the standard (or "average") relationship among the acceleration stroke S, vehicle speed V and acceleration G, as the "second reference acceleration model", from driving data provided by a plurality of drivers DR while reflecting various driving directivities of the driver DR on the relationship. In the neural network in FIG. 13, the "high mode (H)" among the aforementioned directivity modes DM is set. The value of the acceleration stroke S is input to one of the neurons n1 of the "input field" and the value of the vehicle speed V is input to the other neuron n1, as per the first embodiment. The value of the second reference acceleration model output Gs2 (H), which corresponds to the values of the acceleration stroke S and vehicle speed V and reflects the high-acceleration driving, is obtained as the output result from the neuron n3 of the "output field".

In the neural network in FIG. 14, the "normal mode (N)" among the aforementioned directivity modes DM is set. The value of the acceleration stroke S is input to one of the neurons n1 of the "input field" and the value of the vehicle speed V is input to the other neuron n1, as per the first embodiment. The value of the second reference acceleration model output Gs2 (N), which corresponds to the values of the acceleration stroke S and vehicle speed V and reflects the standard-acceleration driving, is obtained as the output result from the neuron n3 of the "output field".

In the neural network in FIG. 15, the "low mode (L)" among the aforementioned directivity modes DM is set. The value of the acceleration stroke S is input to one of the neurons n1 of the "input field" and the value of the vehicle speed V is input to the other neuron n1, as per the first embodiment. The value of the second reference acceleration model output Gs2 (L), which corresponds to the values of the acceleration stroke S and vehicle speed V and reflects the low-acceleration driving, is obtained as the output result from the neuron n3 of the "output field".

Figure 18:
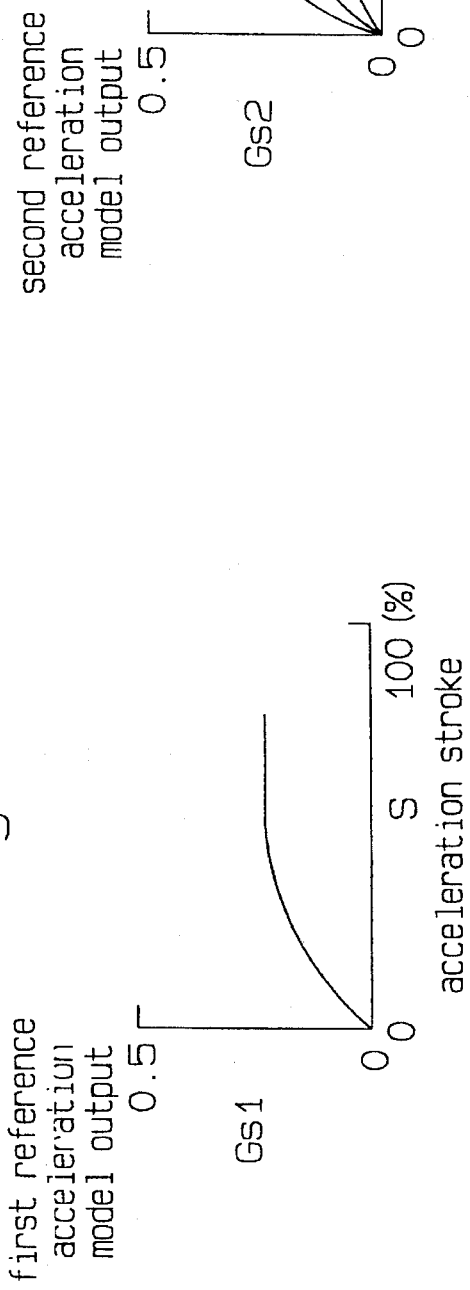
FIG. 18 is a characteristic diagram showing the characteristic of a "second reference acceleration model" that is also learned by the neuro computer.

In other words, the "second reference acceleration model" which reflects those directivity modes DM has been learned in advance as various characteristics shown in FIG. 18. In the following description, the individual second reference acceleration model outputs Gs2 (H), Gs2 (N) and Gs2 (L), when mentioned collectively, will be referred to as the second reference acceleration model Gs2 for the sake of convenience.

Figure 19:
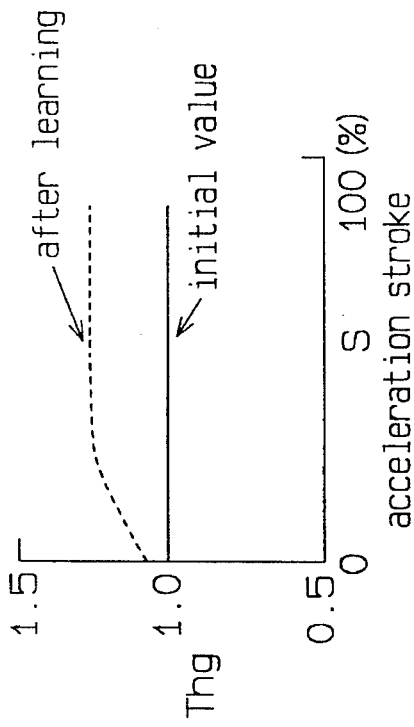
FIG. 19 is a characteristic diagram showing the characteristic of a "throttle sensitivity" that is also learned by the neuro computer.

In this embodiment too, the above-described conceptual structure of the neural network is merely given for the sake of convenience. The core of the neural network lies in the learning control program which is stored in advance in the ROM of the neuro computer 22. The neural network is realized by mathematical operations in the learning control program. A typical "error feedback learning algorithm" is applied as the learning method. In this embodiment, the learning control program is prepared to finally obtain the relationship between the acceleration stroke S and the throttle sensitivity Thg as shown in FIG. 19.

Figure 20:
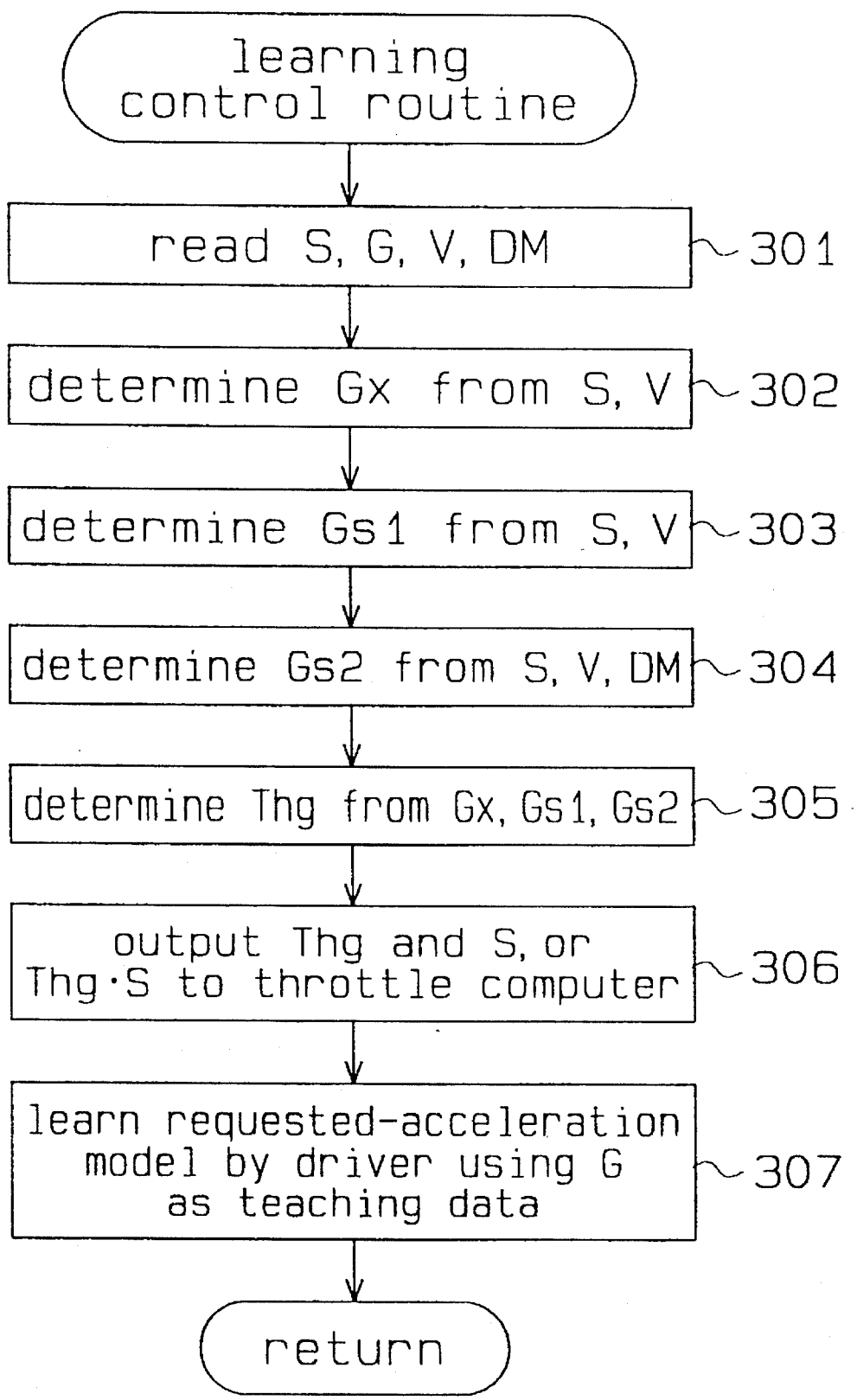
FIG. 20 is a flowchart illustrating a "learning control routine" that is also executed by the neuro computer.

A description will now be given of operations for learning the "requested-acceleration model", "throttle sensitivity model" and other models which are executed by the neuro computer 22 using the above-described neural network technology. FIG. 20 shows a flowchart illustrating the "learning control routine" in the learning control program, which is cyclically run by the neuro computer 22. This routine is cyclically executed at a given period, for example, "0.1 sec", once the routine starts.

When this routine starts, the neuro computer 22 reads the acceleration stroke S, acceleration G, vehicle speed V and directivity mode DM based on various signals from the individual sensors 11 to 13 and the mode select switch 14 in step 301.

In the next step 302, the neuro computer 22 determines the value of the requested-acceleration model output Gx based on the values of the acceleration stroke S and vehicle speed V read this time. In other words, the neuro computer 22 computes the value of the requested-acceleration model output Gx from the characteristic of the already learned "requested-acceleration model" (see FIG. 16) based on the values of the acceleration stroke S and vehicle speed V as input values.

In the next step 303, the neuro computer 22 determines the value of the first reference acceleration model output Gs1 based on the values of the acceleration stroke S and vehicle speed V read this time. In other words, the neuro computer 22 computes the value of the first reference acceleration model output Gs1 from the characteristic of the already learned "first reference acceleration model" (see FIG. 17) based on the values of the acceleration stroke S and vehicle speed V as input values.

In step 304, the neuro computer 22 determines the value of the second reference acceleration model output Gs2 from the currently read values of the acceleration stroke S and vehicle speed V and the signal of the directivity mode DM. That is, the computer 22 selects the second reference acceleration model for the "high mode (H)", which has been already learned, the second reference acceleration model for the "normal mode (N)", or the second reference acceleration model for the "low mode (L)" in association with the specified directivity mode DM. For the selected second reference acceleration model, the value of the second reference acceleration model output Gs2 (H), the value of the second reference acceleration model output Gs2 (N) or the value of the second reference acceleration model output Gs2 (L) is computed from the characteristic of the second reference acceleration model (see FIG. 18) based on the values of the acceleration stroke S and vehicle speed V as input values.

In step 305, the neuro computer 22 determines the throttle sensitivity Thg based on the values of the currently obtained requested-acceleration model output Gx, first reference acceleration model output Gs1 and second reference acceleration model output Gs2. More specifically, the neuro computer 22 determines the throttle sensitivity Thg from the following equation (2).

$$Thg = \alpha + (Gs2 - Gs1) * K0 + (Gx - Gs2) * K \quad (2)$$

where $\alpha$ is a reference value that is set to "1.0" in this embodiment, and K and K0 are positive constants with the relation of K>K0.

Suppose that the characteristic of the second reference acceleration model output Gs2 determined by the selected directivity mode DM (high mode (H) in this case) is the curve indicated by the broken line in FIG. 21 while the characteristic of the standard, first reference acceleration model output Gs1 is the curve indicated by the solid line. In this case, the difference (Gs2-Gs1) between the value of the second reference acceleration model output Gs2 with respect to a given acceleration stroke S and the value of the first reference acceleration model output Gs1 is reflected on the value of the throttle sensitivity Thg. In other words, the degree of the normal driving directivity of the driver DR or the high-acceleration directivity in this case is reflected on the value of the throttle sensitivity Thg.

Suppose that the characteristic of the current requested-acceleration model output Gx determined through learning is the curve indicated by the alternate long and two short dashes line in FIG. 21 with respect to the characteristic of the second reference acceleration model output Gs2 as indicated by the broken line. In this case, the difference (Gx-Gs2) between the value of the requested-acceleration model output Gx with respect to a given acceleration stroke S and the value of the second reference acceleration model output Gs2 is reflected on the value of the throttle sensitivity Thg. In other words, the strength of the acceleration G requested at that point by the driver DR (request to provide higher acceleration than that in the "high mode (H)") is reflected on the value of the throttle sensitivity Thg.

The neuro computer 22 sends the value of the currently-determined throttle sensitivity Thg and the value of the acceleration stroke S to the throttle computer 21 in step 306. Alternatively, the computer 22 multiplies the value of the throttle sensitivity Thg by the value of the acceleration stroke S to obtain a target throttle angle Thg°S and sends the target throttle angle Thg°S to the throttle computer 21.

Then, the neuro computer 22 learns the "requested-acceleration model" requested by the driver DR using the value of the acceleration G of the vehicle 1 as "teaching data" in step 307. More specifically, the neuro computer 22 treats the value of the actual acceleration G of the vehicle 1 detected by the acceleration sensor 12, as "teaching data" to be compared, and learns the relationship among the values of the acceleration stroke S, the vehicle speed V and the acceleration G as the "requested-acceleration model" requested by the driver DR, in such a way as to reduce the deviation to the "teaching data".

Figure 16:
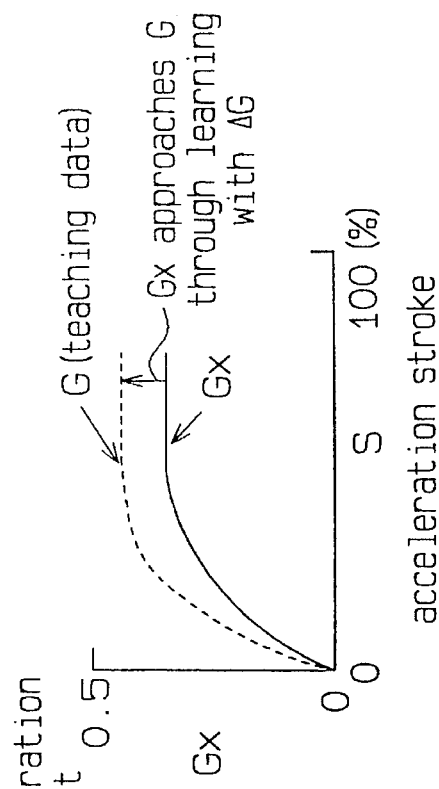
FIG. 16 is a characteristic diagram showing the characteristic of a "requested-acceleration model" that is learned by the neuro computer of the system in FIG. 10.

Suppose that the curve indicated by the solid line in FIG. 16 is the characteristic of the current "requested-acceleration model". Also suppose that the driver DR manipulates the accelerator pedal 10 to make the value of the acceleration G of the vehicle 1 greater than the value of the current requested-acceleration model output Gx. The value of the acceleration G this time is a new requested acceleration, and the current characteristic of the "requested-acceleration model" indicated by the solid line in FIG. 16 is altered to the one indicated by the broken line. That is, the whole relationship among the acceleration stroke S, the vehicle speed V and the requested-acceleration model output Gx is learned as a continuous model. This characteristic will not be partially discontinuous.

Although FIG. 16 shows the characteristics when the value of the vehicle speed V is "0", the relationship among the entire range of the acceleration stroke s, the entire range of the vehicle speed V and the acceleration G of the vehicle 1 is learned in the "requested-acceleration model".

After executing the process of step 307, the neuro computer 22 temporarily terminates the subsequent process. When "0.1 sec" passes after the routine has started, the neuro computer 22 starts the routine from step 301 again.

Learning control using the neural network technology is carried out in this manner, and the characteristic of the "requested-acceleration model" requested by the driver DR is learned. In the learning, the "weighting coefficients" of the synapses sp as the characteristic of the "requested-acceleration model", which is occasionally learned, will be rewritten and stored in the backup RAM.

The initial values of the "weighting coefficients" of the "requested-acceleration model" at the time of factory shipment of the vehicle 1 are those of the "first reference acceleration model".

The throttle computer 21 executes the throttle angle control based on the value of the throttle sensitivity Thg, determined through the above-described processes, and the value of the acceleration stroke S then. Since the contents of the throttle angle control in this embodiment are the same as those of the first embodiment illustrated in the flowchart in FIG. 8, their description will not be given here. The throttle computer 21 controls the rotation of the DC motor in such a way that the value of the throttle angle Th coincides with the value of the target throttle angle Thg°S, thus controlling the angle of the throttle valve 7. As a result, the output of the engine 2 is controlled and the driving power of the vehicle 1 is controlled accordingly.

As described above, according to the second embodiment, a request on the running of the vehicle 1 made by the driver DR is estimated as the "requested-acceleration model" from the value of the actual acceleration G detected occasionally. The difference (Gx–Gs2) between the value of the requested-acceleration model output Gx obtained from the "requested-acceleration model" and the value of the second reference acceleration model output Gs2, which is obtained from the "second reference acceleration model" and reflects the driving directivity of the driver DR, is attained. In addition, the difference (Gs2–Gs1) between the value of the second reference acceleration model output Gs2 and the value of the first reference acceleration model output Gs1, obtained from the standard "first reference acceleration model", is attained. Further, the value of the throttle sensitivity Thg is determined in accordance with those differences (Gx–Gs2) and (Gs2–Gs1). The angle of the throttle valve 7 is controlled in such a way that the value of the target throttle angle Thg°S, the product of the determined value of the throttle sensitivity Thg and the value of the acceleration stroke S, coincides with the value of the actual throttle angle Th.

In other words, according to this embodiment, the angle of the throttle valve 7 of the engine 2 or the throttle angle Th is controlled with the acceleration G, which always meets the request by the driver DR and reflects the driving directivity of the driver DR.

Based on the value of the former difference (Gx–Gs2), the degree of the value of the actual acceleration G requested at that point of time by the driver DR is reflected on the throttle sensitivity Thg. When the value of the acceleration requested by the driver DR at that time or the value of the requested-acceleration model output Gx is larger than that of the characteristic of the second reference acceleration model output Gs2 corresponding to the selected directivity mode DM, therefore, the value of the throttle sensitivity Thg becomes relatively large. This relatively narrows the range of the acceleration stroke S that should be changed to provide the same acceleration G. Therefore, a large acceleration G can be obtained merely by slight manipulation of the accelerator pedal 10, allowing the driver DR to feel as if the acceleration performance of the vehicle 1 is improved. That is, when the driver DR wants to drive the vehicle 1 fast, even slight manipulation of the accelerator pedal 10 can provide a large acceleration G, thus improving the feeling of the acceleration of the vehicle 1 for the driver DR.

When the value of the requested-acceleration model output Gx is smaller than that of the characteristic of the second reference acceleration model output Gs2 corresponding to the selected directivity mode DM, on the other hand, the value of the throttle sensitivity Thg becomes relatively small. This relatively widens the range of the acceleration stroke S that should be changed to provide the same acceleration G. Therefore, the value of the acceleration G can be changed finely by large manipulation of the accelerator pedal 10, thus improving the operability of the accelerator pedal 10 for the driver DR. That is, when the driver DR wants to drive the vehicle 1 slowly, large manipulation of the accelerator pedal 10 can allow the value of the acceleration G to be finely changed, thus improving the feeling of the maneuverability of the vehicle 1 for the driver DR.

According to this embodiment, therefore, learning is executed in such a manner that the control matches with the degree of the request on the acceleration G made by the driver DR, so that the value of the throttle sensitivity Thg always matching with the characteristic of the driver DR is determined. Accordingly, the driving power control on the vehicle 1 which always matches with the characteristic of the driver DR can be performed, regardless of the mental state of the driver DR and the driving conditions of the vehicle 1.

In addition, based on the value of the latter difference (Gs2–Gs1), the degree of the normal driving directivity of the driver DR is reflected on the value of the throttle sensitivity Thg. That is, the degree of the directivity corresponding to the "high mode (H)", "normal mode (N)" or "low mode (L)" is selectively reflected on the value of the throttle sensitivity Thg. When the characteristic of the second reference acceleration model output Gs2 corresponding to the directivity mode DM selected then is larger than the characteristic of the standard, first reference acceleration model output Gs1, therefore, the value of the throttle sensitivity Thg becomes relatively large. Large acceleration G can thus be obtained merely by slight manipulation of the accelerator pedal 10 by the increase in the value of the throttle sensitivity Thg. This allows the driver DR to feel as if the driving directivity of the driver DR is reflected on the acceleration performance of the vehicle 1 and the acceleration performance is improved.

When the characteristic of the second reference acceleration model output Gs2 corresponding to the directivity mode DM selected then is smaller than the characteristic of the standard, first reference acceleration model output Gs1, therefore, the value of the throttle sensitivity Thg becomes relatively small. The acceleration G can thus be changed finely by large manipulation of the accelerator pedal 10 by the decrease in the value of the throttle sensitivity Thg. This allows the driver DR to feel as if the driving directivity of the driver DR is reflected on the acceleration performance of the vehicle 1 and the maneuverability of the vehicle 1 is improved.

As the driver DR, who intends to always drive the vehicle 1 fast, selects the "high mode (H)" through the mode select switch 14, therefore, the driving of the vehicle 1 can immediately be set to the one which matches with the high-acceleration directivity. Likewise, as the driver DR, who intends to always drive the vehicle 1 slowly, selects the "low mode (L)" through the mode select switch 14, the driving of the vehicle 1 can immediately be set to the one which matches with the low-acceleration directivity. Or, as the driver DR, who intends to always drive the vehicle 1 at the normal speed, selects the "normal mode (N)" through the mode select switch 14, the driving of the vehicle 1 can immediately be set to the one which matches with the intermediate-acceleration directivity.

In other words, it is possible to perform control on the driving power of the engine 2, and thus on the driving power of the vehicle 1, which always matches with the characteristic of the driver DR, regardless of the mental state of the driver DR and the driving conditions of the vehicle 1. It is also possible to perform control on the driving power of the engine 2, and thus on the driving power of the vehicle 1, which reflects the driving directivity of each driver DR.

Further, according to this embodiment too, since the neural network technology is employed in learning control by the neuro computer 22, the whole relationship among the values of the acceleration stroke S, the vehicle speed V and the requested-acceleration model output Gx is learned as a continuous model, and the characteristic will not be partially discontinuous. This is because the use of the neural network technology interpolates the "requested-acceleration model" which should be learned between discontinuous points of the acceleration stroke S and vehicle speed V. That is, the correction of the requested-acceleration model output Gx that is to be conducted for a specific range of the acceleration stroke S and the vehicle speed V reflects on the correction of the requested-acceleration model output Gx for another range of the acceleration stroke S and vehicle speed V.

Accordingly, it is possible to continuously control the driving power of the vehicle 1 for the entire range of the vehicle speed V for the amount of the manipulation of the accelerator pedal 10 by the driver DR or over the entire manipulation range of the acceleration stroke S. When the accelerator pedal 10 is continuously thrust downward over a certain range, therefore, the acceleration G of the vehicle 1 will not change abruptly, thus always ensuring a smooth increase in vehicle speed V.

Further, according to this embodiment, the value of the throttle sensitivity Thg is determined from the difference between the value of the requested-acceleration model output Gx, which is estimated from the value of the actual acceleration G, and the value of the reference acceleration model output Gs. This eliminates the need for interpolation of a map and will shorten the calculation time accordingly as compared with the case where a map is redrawn by the conventional compensation (correction).

Although only two embodiments of the present invention have been described herein, it should be apparent to those skilled in the art that the present invention may be embodied in many other specific forms without departing from the spirit or scope of the invention. Particularly, it should be understood that this invention may be embodied in the following manners.

In the above-described embodiments, the gasoline engine 2 is used as the driving source, and the linkless throttle valve 7 is provided to change the control amount of the engine 2. The driving source may be other than the gasoline engine, in which case means for changing the control amount of the new driving source should be provided. For instance, an electronic motor, such as a DC motor, may be used as the driving source in an electric vehicle and the control-amount changing means may be a current control circuit or the like which controls the current to the electric motor.

Although the accelerator pedal 10, which is operated by the driver DR, is provided to control the acceleration G of the vehicle 1 in the individual embodiments, an acceleration lever or other manipulating members may be used instead.

Although the acceleration stroke S is detected by the accelerator pedal sensor 11 in the above embodiments, a sensor which detects the thrusting force on the accelerator pedal may be used to replace the acceleration stroke S with this thrusting force, or the accelerator pedal sensor for detecting the acceleration stroke S and the sensor for detecting the thrusting force on the accelerator pedal may be used together.

Although the acceleration sensor 12 for detecting the value of the actual acceleration G of the vehicle 1 is used in the individual embodiments, the value of the acceleration G may be obtained by differentiating the value of the vehicle speed V, detected by the vehicle speed sensor 13, with time.

Although a multi-field neural network is employed in the neuro computer 22 in the individual embodiments, a mutually-coupled type neural network may be employed instead.

Although the throttle sensitivity Thg is obtained from the equation (1) in the first embodiment, it may be attained from the following equation (3).

$$Thg = \alpha + \{(Gx/Gs) - 1.0\} * K \quad (3)$$

Although the previously learned "reference acceleration model" is stored in the form of a multi-field neural network in the ROM 24 of the neuro computer 22 in the first embodiment, it may be stored in a map form in this ROM 24.

In the second embodiment, although K>K0 in the equation (2), K may be set smaller than K0 (K<K0) or equal to K0 (K=K0). In the former case of K<K0, the directivities (preferences) of the driver DR will be reflected more on the value of the throttle sensitivity Thg.

Although the throttle sensitivity Thg is obtained from the equation (2) in the second embodiment, it may be attained from the following equation (3).

$$Thg = \alpha + \{(Gs2/Gs1) - 1.0\} * K0 + \{(Gx/Gs2) - 1.0\} K \quad (4)$$

In the second embodiment, the difference between the value of the requested-acceleration model output Gx and the value of the second reference acceleration model output Gs2 is obtained and used to compute the value of the throttle sensitivity Thg. Alternatively, the difference (Gx–Gs1) between the value of the requested-acceleration model output Gx and the value of the first reference acceleration model output Gs1 may be obtained and used to compute the value of the throttle sensitivity Thg. The throttle sensitivity Thg may also be attained from the following equations (5) and (6).

$$Thg = \alpha + (Gs2 - Gs1) * K0 + (Gx - Gs1) * K \quad (5)$$

$$Thg = \alpha + \{(Gs2/Gs1) - 1.0\} * K0 + \{(Gx/Gs1) - 1.0\} * K \quad (6)$$

The same function and advantage as the second embodiment will be provided by the above modifications.

Although the previously learned standard, "first reference acceleration model" is stored in the form of a multi-field neural network in the ROM of the neuro computer 22 in the second embodiment, it may be stored in a map form in this ROM.

In the second embodiment, the "second reference acceleration model" which reflects various driving directivities of the driver DR is stored in the form of a plurality of multi-field neural networks in the ROM of the neuro computer 22. The "second reference acceleration model" according to various driving directivities of the driver DR may be stored in the form of a plurality of maps in this ROM.

In the second embodiment, the "second reference acceleration model" which reflects various driving directivities of the driver DR is stored in the form of three types of multi-field neural networks in the ROM of the neuro computer 22. This "second reference acceleration model", like the "requested-acceleration model", may always be learned using one multi-field neural network. That is, the "second reference acceleration model" in use may be selected from previously-learned models, or may be what is occasionally learned.

In this case, the learning ratio of the "second reference acceleration model" or the number of times learning is to be performed per unit time, is made smaller than that of the "requested-acceleration model" and the relationship among the values of the acceleration stroke S, vehicle speed V and acceleration G is learned. It is therefore possible to obtain the "second reference acceleration model" which reflects the driving directivity of each driver DR. What is more, the "second reference acceleration model" can be attained without the driver's operation of a specific switch or the like. It is also possible to reduce the number of multi-field neural networks to be used.

With regard to the driving of the vehicle 1 over a period specified by the driver DR, the relationship among the values of the acceleration stroke S, vehicle speed V and acceleration G is learned. It is therefore possible to obtain the "second reference acceleration model" which reflects the driving of the vehicle 1 over the period specified by the driver DR.

Alternatively, the characteristic of the "requested-acceleration model" at the time the driver DR specifies may be replaced with the "second reference acceleration model". Accordingly, it is possible to obtain the "second reference acceleration model" which reflects the driving of the vehicle 1 before the time specified by the driver DR.

Therefore, the present examples and embodiments are to be considered as illustrative and not restrictive and the invention is not to be limited to the details given herein, but may be modified within the scope of the appended claims.

What is claimed is:

1. A driving power control apparatus for a vehicle, having a driving source mounted in a vehicle, driving wheels drivably coupled to said driving source in said vehicle, control-amount changing means for changing a control amount of said driving source, manipulation means for arbitrarily controlling an output of said driving source, and manipulation-amount detecting means for detecting a manipulation amount of said manipulation means, for activating said control-amount changing means in accordance with a value detected by said manipulation-amount detecting means to control said output of said driving source, thereby controlling driving power of said vehicle caused by said driving wheels, said apparatus comprising:

means for detecting an acceleration of said vehicle;

means for detecting a speed of said vehicle;

memory means for storing a reference acceleration model reflecting a previously learned relationship among said manipulation amount of said manipulation means, said speed of said vehicle and said acceleration of said vehicle;

learning means for computing, as an error signal, a difference between an acceleration detected by said acceleration detecting means as teaching data to be compared, and an output of said acceleration detecting means, and learning a relationship among a manipulation amount detected by said manipulation-amount detecting means, a speed detected by said speed detecting means and said acceleration of said vehicle, as a acceleration model requested by said driver;

computing means for computing a difference between an output of said acceleration model to be learned by said learning means and said reference acceleration model stored in said memory means, and computing a relationship among said manipulation amount detected by said manipulation-amount detecting means, said speed detected by said speed detecting means and said control amount of said driving source, as a control amount sensitivity, based on said difference; and control means for controlling activation of said control-amount changing means in accordance with said manipulation amount detected by said manipulation-amount detecting means, based on said control amount sensitivity computed by said computing means.

2. The driving power control apparatus according to claim 1, wherein said control-amount changing means is a throttle valve actuated by a motor.

3. The driving power control apparatus according to claim 1, wherein said manipulation means is an accelerator pedal and said manipulation-amount detecting means is an accelerator pedal sensor for detecting an acceleration stroke of said accelerator pedal.

4. The driving power control apparatus according to claim 1, wherein said acceleration detecting means is an acceleration sensor for detecting forward and backward accelerations, and a detection signal from said acceleration sensor is put through a low-pass filter to be adjusted.

5. The driving power control apparatus according to claim 1, wherein said memory means and said learning means are constituted by a neuro computer employing a neural network.

6. The driving power control apparatus according to claim 1, wherein said reference acceleration model is stored in a map form in said memory.

7. The driving power control apparatus according to claim 1, wherein said computing means computes a throttle sensitivity as said control amount sensitivity in accordance with an equation given below:

$$Thg = \alpha + (Gx - Gs) * K$$

where Thg is said throttle sensitivity, $\alpha$ is a reference value, Gx is a requested-acceleration model output, Gs is a reference acceleration model output, and K is a positive constant.

8. The driving power control apparatus according to claim 1, wherein said computing means computes a throttle sensitivity as said control amount sensitivity in accordance with an equation given below:

$$Thg = \alpha + \{(Gx/Gs) - 1\} * K$$

where Thg is said throttle sensitivity, $\alpha$ is a reference value, Gx is a requested-acceleration model output, Gs is a reference acceleration model output, and K is a positive constant.

9. The driving power control apparatus according to claim 1, wherein said control-amount changing means is a throttle valve openable and closable by a motor;

said manipulation means is an accelerator pedal and said manipulation-amount detecting means is an accelerator pedal sensor for detecting an acceleration stroke of said accelerator pedal;

said computing means computes a throttle sensitivity as said control amount sensitivity; and said control means is constituted of a throttle computer for controlling said DC motor in such a manner that a result of multiplication of said throttle sensitivity to be computed by said acceleration stroke to be detected, as a target throttle angle, matches with an actual throttle angle.

10. A driving power control apparatus for a vehicle, having a driving source mounted in a vehicle, driving wheels drivably coupled to said driving source in said vehicle, control-amount changing means for changing a control amount of said driving source, manipulation means operable by a driver to arbitrarily control an output of said driving source, and manipulation-amount detecting means for detecting a manipulation amount of said manipulation means, for activating said control-amount changing means in accordance with a value detected by said manipulation-amount detecting means to control said output of said driving source, thereby controlling driving power of said vehicle caused by said driving wheels, said apparatus comprising:

means for detecting an acceleration of said vehicle;

means for detecting a speed of said vehicle;

first memory means for storing a standard first reference acceleration model reflecting a previously learned relationship among said manipulation amount of said manipulation means, said speed of said vehicle and said acceleration of said vehicle;

second memory means for storing a second reference acceleration model reflecting a learned relationship among said manipulation amount of said manipulation means, said speed of said vehicle and said acceleration of said vehicle and reflecting learned driving directivities of said driver;

learning means for computing, as an error signal, a difference between an acceleration detected by said acceleration detecting means as teaching data to be compared, and an output of said acceleration detecting means, and learning a relationship among a manipulation amount detected by said manipulation-amount detecting means, a speed detected by said speed detecting means and said acceleration of said vehicle, as a acceleration model requested by said driver;

computing means for computing a difference between a second reference acceleration model stored in said second memory and a first reference acceleration model stored in said first memory means, computing a difference between an output of said acceleration model to be learned by said learning means and said first reference acceleration model stored in said first memory means or said second reference acceleration model stored in said second memory means, and computing a relationship among said manipulation amount detected by said manipulation-amount detecting means, said speed detected by said speed detecting means and said control amount of said driving source, as a control amount sensitivity, based on said differences; and control means for controlling activation of said control-amount changing means in accordance with said manipulation amount detected by said manipulation-amount detecting means, based on said control amount sensitivity computed by said computing means.

11. The driving power control apparatus according to claim 10, wherein said control-amount changing means is a throttle valve openable and closable by a motor.

12. The driving power control apparatus according to claim 10, wherein said manipulation means is an accelerator pedal and said manipulation-amount detecting means is an accelerator pedal sensor for detecting an acceleration stroke of said accelerator pedal.

13. The driving power control apparatus according to claim 10, wherein said acceleration detecting means is an acceleration sensor for detecting forward and backward accelerations, and a detection signal from said acceleration sensor is put through a low-pass filter to be adjusted.

14. The driving power control apparatus according to claim 10, wherein said first memory means, said second memory means and said learning means are constituted by a neuro computer employing a neural network.

15. The driving power control apparatus according to claim 10, wherein said first reference acceleration model is stored in a map form in said memory.

16. The driving power control apparatus according to claim 10, wherein said second reference acceleration model is stored in a map form in said memory.

17. The driving power control apparatus according to claim 10, wherein said second reference acceleration model is stored in a map form in said memory as a plurality of directivity modes reflecting various driving directivities of said driver, and said directivity modes are selectable by operating a mode select switch.

18. The driving power control apparatus according to claim 10, wherein said second reference acceleration model is stored in a map form in a memory of said neural computer as a plurality of directivity modes reflecting various driving directivities of said driver, and said directivity modes are selectable by operating a mode select switch, whereby said neuro computer computes said control amount sensitivity based on said directivity mode selected by operating said mode select switch.

19. The driving power control apparatus according to claim 10, wherein said computing means computes a throttle sensitivity as said control amount sensitivity in accordance with an equation given below:

$$Thg = \alpha + (Gs2 - Gs1) * K0 + (Gx - Gs2) * K$$

where Thg is said throttle sensitivity, $\alpha$ is a reference value, Gx is a requested-acceleration model output, Gs1 is a first reference acceleration model output, Gs2 is a second reference acceleration model output, and K and K0 are positive constants.

20. The driving power control apparatus according to claim 10, wherein said computing means computes a throttle sensitivity as said control amount sensitivity in accordance with an equation given below:

$$Thg = \alpha + \{(Gs2/Gs1) - 1.0\} * K0 + \{(Gx/Gs2) - 1.0\} * K$$

where Thg is said throttle sensitivity, $\alpha$ is a reference value, Gx is a requested-acceleration model output, Gs1 is a first reference acceleration model output, Gs2 is a second reference acceleration model output, and K and K0 are positive constants.

21. The driving power control apparatus according to claim 10, wherein said computing means computes a throttle sensitivity as said control amount sensitivity in accordance with an equation given below:

$$Thg = \alpha + (Gs2 - Gs1) * K0 + (Gx - Gs1) * K$$

where Thg is said throttle sensitivity, $\alpha$ is a reference value, Gx is a requested-acceleration model output, Gs1 is a first reference acceleration model output, Gs2 is a second reference acceleration model output, and K and K0 are positive constants.

22. The driving power control apparatus according to claim 10, wherein said computing means computes a throttle sensitivity as said control amount sensitivity in accordance with an equation given below:

$$Thg = \alpha + \{(Gs2/Gs1) - 1.0\} * K0 + \{(Gx/Gs1) - 1.0\} * K$$

where Thg is said throttle sensitivity, α is a reference value, Gx is a requested-acceleration model output, Gs1 is a first reference acceleration model output, Gs2 is a second reference acceleration model output, and K and K0 are positive constants.

23. The driving power control apparatus according to claim 10, wherein said control-amount changing means is a throttle valve openable and closable by a motor;

said manipulation means is an accelerator pedal and said manipulation-amount detecting means is an accelerator pedal sensor for detecting an acceleration stroke of said accelerator pedal;

said computing means computes a throttle sensitivity as said control amount sensitivity; and said control means is constituted of a throttle computer for controlling said motor in such a manner that a result of multiplication of said throttle sensitivity to be computed by said acceleration stroke to be detected, as a target throttle angle, matches with an actual throttle angle.

* * * * *

UNITED STATES PATENT AND TRADEMARK OFFICE
CERTIFICATE OF CORRECTION

PATENT NO. : 5,477,825         Page 1 of 2
DATED : 26 December 1995
INVENTOR(S) : Tatsuya HATTORI et al.

It is certified that error appears in the above-identified patent and that said Letters Patent is hereby corrected as shown below:

| Column | Line | |
|---|---|---|
| 1 | 60 | After "actuator" delete "is". |
| 1 | 64 | Change "valve" to --value--. |
| 2 | 11 | After "is" insert --again--. |
| 2 | 12 | Delete "again". |
| 2 | 64 | Change "driving" to --drive--. |
| 2 | 65 | Change "driving" to --drive--. |
| 5 | 38 | Change "font-engined" to --front-engined--. |
| 8 | 34 | After "read" insert --at--. |
| 15 | 30 | After "read" insert --at--. |
| 15 | 39 | After "read" insert --at--. |

UNITED STATES PATENT AND TRADEMARK OFFICE
CERTIFICATE OF CORRECTION

PATENT NO. : 5,477,825
DATED : 26 December 1995
INVENTOR(S) : Tatsuya HATTORI et al.

It is certified that error appears in the above-identified patent and that said Letters Patent is hereby corrected as shown below:

| Column | Line | |
|---|---|---|
| 17 | 28 | After "motor" insert --8--. |
| 20 | 42 | Change "(3)" to --(4)--. |
| 20 | 65 | After "ROM" insert --24--. |
| 20 | 67 | After "ROM" insert --24--. |
| 21 | 4 | After "ROM" insert --24--. |
| 21 | 7 | After "ROM" insert --24--. |
| 21 | 11 | After "ROM" insert --24--. |

Signed and Sealed this

Twenty-fifth Day of June, 1996

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,477,825
DATED : December 26, 1995
INVENTOR(S) : Tatsuya Hattori et al.

It is certified that error appears in the above-indentified patent and that said Letters Patent is hereby corrected as shown below:

Column 1, line 67, change "value" to —valve—.

Signed and Sealed this

Twenty-fourth Day of September, 1996

Attest:

BRUCE LEHMAN

Attesting Officer     Commissioner of Patents and Trademarks